US011218881B1

(12) United States Patent
De et al.

(10) Patent No.: US 11,218,881 B1
(45) Date of Patent: Jan. 4, 2022

(54) MITIGATING FAKE CELL IMPRISONMENT

(71) Applicant: QUALCOMM incorporated, San Diego, CA (US)

(72) Inventors: Subrato Kumar De, San Diego, CA (US); Sivasubramanian Ramalingam, Hyderabad (IN); Ankur Bhattacharjee, San Diego, CA (US); Rahul Chandrashekar Sahukar, Anavatti (IN); Muralidharan Murugan, Hyderabad (IN); Mattias Kaulard Huber, Solana Beach, CA (US); Krishna Ram Budhathoki, San Diego, CA (US); Syam Prasad Reddy Battula, Hyderabad (IN); Sattwik Nandi, Hyderabad (IN); Harshpreet Singh, New Delhi (IN); Gaurav Singh, Hyderabad (IN); Rishika Tindola, Hyderabad (IN); Arvind Vardarajan Santhanam, San Diego, CA (US); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/070,300

(22) Filed: Oct. 14, 2020

(30) Foreign Application Priority Data

Jul. 28, 2020 (IN) .............................. 202041032290

(51) Int. Cl.
*H04W 12/122* (2021.01)
*H04W 36/00* (2009.01)
(Continued)

(52) U.S. Cl.
CPC ......... *H04W 12/122* (2021.01); *H04W 12/06* (2013.01); *H04W 12/10* (2013.01);
(Continued)

(58) Field of Classification Search
CPC ... H04W 12/122; H04W 12/66; H04W 12/67; H04W 12/73; H04W 12/10; H04W 36/0061; H04W 36/08; H04W 12/06
See application file for complete search history.

(56) References Cited

U.S. PATENT DOCUMENTS 10,129,283 B1 * 11/2018 Briggs ................ H04W 12/126
2007/0079376 A1 * 4/2007 Robert ................ H04L 63/1441
726/23
(Continued)

FOREIGN PATENT DOCUMENTS

EP 3258719 A1 12/2017
WO 2018218518 A1 12/2018

OTHER PUBLICATIONS

International Search Report and Written Opinion—PCT/US2021/034162—ISA/EPO—dated Aug. 20, 2021, 13 pages.

*Primary Examiner* — Mazda Sabouri
(74) *Attorney, Agent, or Firm* — The Marbury Law Group, PLLC

(57) ABSTRACT

In various embodiments, a wireless device processor may determine a threat score for a first cell, determine whether the first cell threat score is below a first threat score threshold, update a good neighbor cell data structure using neighbor cell information from the first cell in response to determining that the first cell threat score is below the first threat score threshold, performing cell reselection to a second cell, determine whether the second cell transmits a system information block message indicating fake neighbor cell information, and increase a threat score for the second cell in response to determining that the second cell provides the SIB message indicating fake neighbor cell information and that a good neighbor cell data structure includes an indication of one or more good neighbor cells that are within (Continued)

the time threshold and the location threshold and doing countermeasures in a response to the determination.

30 Claims, 13 Drawing Sheets

(51) Int. Cl.
  *H04W 36/08* (2009.01)
  *H04W 12/06* (2021.01)
  *H04W 12/10* (2021.01)
  *H04W 12/60* (2021.01)
  *H04W 12/67* (2021.01)
  *H04W 12/73* (2021.01)

(52) U.S. Cl.
  CPC .......... *H04W 12/66* (2021.01); *H04W 12/67* (2021.01); *H04W 12/73* (2021.01); *H04W 36/0061* (2013.01); *H04W 36/08* (2013.01)

(56) References Cited

U.S. PATENT DOCUMENTS

| | | | | |
|---|---|---|---|---|
| 2013/0344844 | A1* | 12/2013 | Goldfarb | H04W 12/125 455/411 |
| 2014/0118113 | A1* | 5/2014 | Kaushik | G01S 5/0231 340/8.1 |
| 2016/0381545 | A1* | 12/2016 | Wang | H04W 12/122 455/434 |
| 2019/0110205 | A1* | 4/2019 | Shaik | H04L 63/0876 |
| 2019/0132231 | A1* | 5/2019 | Justin | G06N 20/20 |
| 2020/0107197 | A1* | 4/2020 | Kaushik | H04W 88/08 |
| 2021/0067972 | A1* | 3/2021 | McGrath | H04W 12/06 |

* cited by examiner

MITIGATING FAKE CELL IMPRISONMENT

RELATED APPLICATIONS

This application claims priority to India Provisional Patent Application No. 202041032290 entitled "Mitigating Fake Cell Imprisonment" filed Jul. 28, 2020, the entire contents of which are incorporated herein by reference.

BACKGROUND

Wireless devices typically access a communication network via communications with a base station. In many instances the base station is a device that is previously unknown to the wireless device. The processes used by wireless devices to identify and establish communication with a base station provide a potential security vulnerability for the wireless device. For example, a malicious device may present itself as a legitimate base station, establishing a fake cell with which a wireless device may connect. Such a wireless device may then be vulnerable to data theft, a download of malicious software, or interception of its communications by the fake cell. Further, a malicious device operating a fake cell may attempt to manipulate information provided to a wireless device which, if not countered, could result in the wireless device remaining camped on the malicious device despite the actual availability legitimate base stations capable of providing wireless services, a condition sometimes referred to as "imprisonment."

SUMMARY

Various aspects include methods that may enable a processor of a wireless device to determine whether a device in communication with the wireless device is an illegitimate or fake cell and perform actions to gracefully switch connections to a legitimate cell despite signaling by the fake cell intended to "imprison" the wireless device.

Various aspects may include determining a threat score for a first cell when the wireless device performs cell selection to the first cell, determining whether the threat score for the first cell is below a first threat score threshold indicative of a trustworthy cell, updating a data structure in the wireless device that stores cell data on one or more neighbor cells determined by the wireless device to be authentic, which is referred to herein as a "good neighbor cell data structure." In updating the good neighbor cell data structure, the wireless device may use neighbor cell information from the first cell in response to determining that the threat score for the first cell is below the first threat score threshold. The good neighbor cell data structure may include a location of each neighbor cell, and a time when each neighbor cell was updated. Various aspects may further include performing cell reselection to a second cell, determining whether the second cell transmits a system information block (SIB) message indicating neighbor cell information that appears to be incorrect or is consistent with a fake cell attempting to imprison the wireless device, which is referred to herein as "fake neighbor cell information." Various aspects may further including whether the good neighbor cell data structure includes an indication of one or more good neighbor cells that are within a time threshold and a location threshold, and increasing a threat score for the second cell in response to determining that the second cell provides the SIB message indicating fake neighbor cell information and that the good neighbor cell data structure includes an indication of one or more good neighbor cells that are within the time threshold and the location threshold.

In some aspects, determining whether the second cell provides a SIB message indicating fake neighbor cell information may include determining whether the second cell provides a SIB message that indicates no intra-frequency neighbor cells are available or an Intra-frequency not allowed to reselect indication. In some aspects, determining whether the second cell provides a SIB message indicating fake neighbor cell information may include determining whether the second cell provides a SIB message that indicates a neighbor cell frequency band that is unusable by the wireless device.

In some aspects, determining a threat score for a first cell when the wireless device performs cell selection to the first cell may include performing an authentication procedure for the first cell when the wireless device performs cell selection to the first cell, and updating the good neighbor cell data structure in the wireless device using neighbor cell information from the first cell in response to determining that the threat score for the first cell is below the first threat score threshold may include updating the good neighbor cell data structure using the neighbor cell information from the first cell in response to determining that the first cell has passed the authentication procedure.

In some aspects, the good neighbor cell data structure may include one or more frequencies supported by each neighbor cell. Such aspects may further include determining whether the second cell transmits a SIB message indicating a neighbor cell frequency and identifier that match a frequency and identifier supported by a neighbor cell indicated in the good neighbor cell data structure that is within the time threshold and the location threshold, and increasing the threat score for the second cell in response to determining that the second cell transmits a SIB message indicating no neighbor cell frequency and identifier that match a frequency and identifier supported by a neighbor cell indicated in the good neighbor cell data structure that is within the time threshold and the location threshold.

Some aspects may further include determining whether the threat score for the second cell exceeds a second threat score threshold, deprioritizing the second cell to place the second cell last in a candidate cell data structure in response to determining that the threat score for the second cell exceeds the second threat score threshold, determining whether the candidate cell data structure has been updated with a new candidate cell for cell reselection within a first time interval in response to deprioritizing the second cell, determining whether the wireless device supports a neighbor cell inter-frequency band provided in the SIB message from the second cell within the first time interval, performing a very-short-duration cell bar of the second cell for a second time interval in response to determining that the wireless device does not support a neighbor cell inter-frequency band provided in the SIB message from the second cell nor that the candidate cell data structure provides any new candidate cell for cell reselection, and performing a full search for a candidate cell for cell selection during the second time interval.

Some aspects may further include initializing a timer in response to deprioritizing the second cell to place the second cell last in the candidate cell data structure, determining whether the new candidate cell for cell reselection satisfies a cell reselection criterion in response to determining that the candidate cell data structure has been updated with a new cell reselection candidate cell, and performing the very-short-duration cell bar of the second cell for the second time interval when the timer expires in response to determining that the new candidate cell for cell selection does not satisfy the cell reselection criterion. In such aspects, determining whether the new candidate cell for cell reselection satisfies the cell reselection criterion in response to determining that the candidate cell data structure has been updated with a new candidate cell for cell reselection may include determining whether the wireless device supports a neighbor cell inter-frequency band provided in the SIB message from the second cell within the first time interval. In such aspects, performing cell reselection to one of neighbor cells indicated in the good neighbor cell data structure that are within the time threshold and the location threshold, determining whether the wireless device is repeatedly performing cell reselection to the second cell and the one of the neighbor cells indicated in the good neighbor cell data structure, and performing the very-short-duration cell bar of the second cell for the second time interval in response to determining that the wireless device is repeatedly performing cell reselection to the second cell and the one of the neighbor cells indicated in the good neighbor cell data structure.

In some aspects, performing a cell reselection for a candidate cell during the second time interval may include adding the one or more neighbor cells indicated in the good neighbor cell data structure to the candidate cell data structure, and performing the cell reselection using existing cells in the candidate cell data structure together with newly added one or more neighbor cells indicated in the good neighbor cell data structure.

Some aspects may further include performing a targeted acquisition during the second time interval including selecting one of the neighbor cells indicated in the good neighbor cell data structure, and performing targeted cell acquisition to the selected one of the good neighbor cells indicated in the good neighbor cell data structure. Such aspects may further include determining whether the targeted cell acquisition to the selected one of the neighbor cells indicated in the good neighbor cell data structure was successful, and triggering an out-of-service condition and performing a full search for a candidate neighbor cell in response to determining that the targeted cell acquisition to the selected one of the neighbor cells indicated in the good neighbor cell data structure was not successful.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of the methods summarized above. Further aspects include a system on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
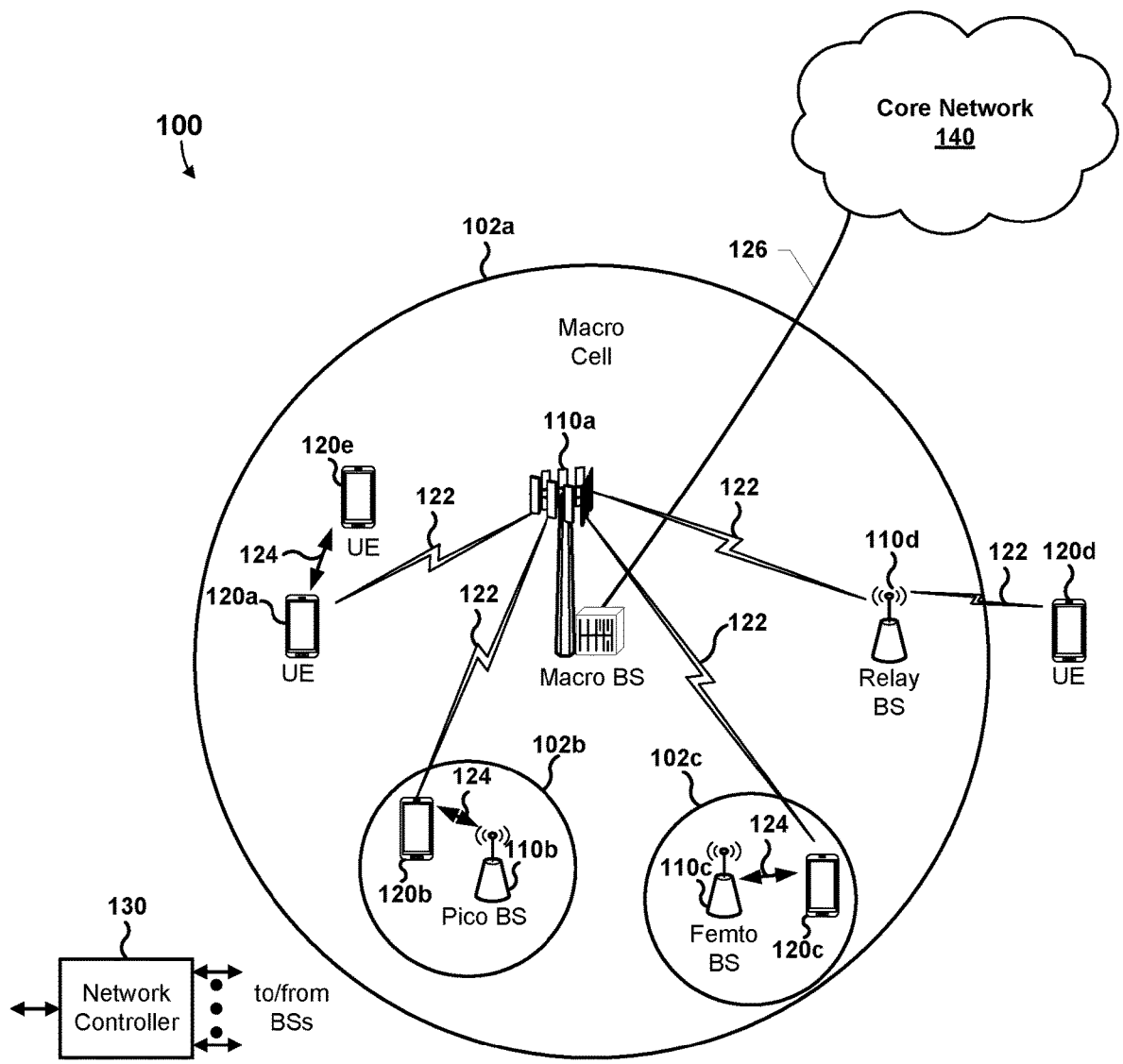
FIG. 1 is a system block diagram conceptually illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and wireless devices configured to use the methods to identify and mitigate fake cell imprisonment. Various embodiments include maintaining a database of cells that the wireless device has determined to be authentic, and using information in that database to facilitate decision making and operations that will enable the wireless device to switch to a legitimate cell, thereby overcoming signaling by the fake cell configured to imprison the wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The terms "fake cell" and "illegitimate cell" are used herein to refer to a device that purports through wireless signaling to be a legitimate base station, but in fact is a rogue or malicious device that is performing wireless communications to appear as a legitimate cell. A fake cell could make use of a wireless communication link established with a wireless device to perform a malicious act on or using the wireless device. A fake cell may attempt to pass itself off as a legitimate cell provided or deployed by a known entity (e.g., network operator, infrastructure provider, etc.) when in fact the fake cell is actually operated or deployed by a different entity that may be malicious in nature. For example, an attacker might position a wireless computing device configured to function as a rogue access point inside or near a company network to attempt man-in-the-middle attacks, such as to steal confidential information or modify messages in transit. As another example, an attacker might position a wireless computing device configured to function as a rogue base station at or near a public location where members of the public typically gather, such as at an airport or a coffee shop.

Base stations provide wireless devices with access to communication networks, such as the Internet, which provides great utility to users. However, the mechanisms for wirelessly connecting to communication networks present potential security vulnerabilities for wireless devices. In many cases, a base station is unknown to the wireless device when a wireless connection is established, such as the first time the wireless device accesses a base station in a new location. In such a situation, a computing device that is actually illegitimate could present itself as a legitimate base station, and the wireless device would have no history (e.g., a base station ID or other information that could be stored in memory) by which to distinguish the fake cell established by the computing device from a legitimate cell. If the wireless device then establishes a trusted communication link with the fake cell, that computing device could access and steal user data, download malicious software to the wireless device, send messages purporting to be from the wireless device to other devices to spread malicious content, or eavesdrop of the wireless device's communications.

Some wireless devices may be configured to identify a fake cell by generating a threat score or evaluation based on various parameters, and then take an appropriate action in response, such as performing cell reselection away from the fake cell to a legitimate neighbor cell. Typically, wireless devices obtain or receive a list of legitimate neighbor cells from a cell with which the wireless device is in active communication (e.g., the cell on which the wireless device is "camped"). For example, the wireless device may receive System Information Block (SIB) messages from a cell that indicate identities of and connection information for neighboring cells. For example, in some Radio Access Technologies (RATs), a cell may communicate intra-frequency neighbor cell information (i.e., cells operating in the same frequency range as the current cell) in a SIB-4 message (e.g., in LTE), communicate inter-frequency neighbor cell information (i.e., cells operating in frequency ranges differing from the current cell) in a SIB-5 message (e.g., in LTE), and so forth.

However, a fake cell may attempt to "imprison" a wireless device by altering its SIB messages to provide no information, or useless information, about neighbor cells. For example, a fake cell may transmit a SIB-4 message indicating that there are no available intra-frequency neighbor cells, or including an "Intra-frequency not allowed to reselect" indication. As another example, a fake cell may transmit a SIB-5 message indicating an intra-frequency neighbor cell associated with a frequency or frequency band that is unusable by the wireless device. Similarly, a fake cell may transmit SIB-6, SIB-7, or SIB-8 messages (e.g., in LTE) indicating that there are no WCDMA, GSM, or CDMA neighbor cells, respectively. Other message types are possible, including variations on system information messages transmitted by various base stations according to different RATs (e.g., 3G, 4G, 5G, etc.). When the wireless device receives SIB messages providing no information or useless information about neighbor cells, the wireless device may determine that it is unable to perform cell reselection away from the fake cell, and remain "imprisoned" by the fake cell. Information provided by a fake cell to "imprison" a wireless device is generally referred to herein as "fake neighbor cell information."

It should be noted that the references to SIB-4, SIB-5, SIB-6, SIB-7, or SIB-8 above are for the case in which the network is a Long Term Evolution (LTE) network. 5G-NR and 3G networks may use different SIB numbers for transmitting the information discussed above.

A wireless device configured to recognize fake base stations or fake cells may not be able to switch to a neighboring cell without causing service disruption that could degrade the user experience. Simply barring a wireless device from communicating with a possible fake cell is an inadequate solution because of the danger of falsely declaring a cell to be fake, which could deny the wireless device access to a communication network. For example, in remote areas, such as national parks, remote inland areas, coastal areas, islands, etc., neighbor cells may be limited. In some cases, only one neighbor cell may be available, or a neighbor cell may be available that uses a different Radio Access Technology (RAT). A signal strength of such neighbor cells may be lower than a handover threshold when the wireless device is in the inner part of a serving cell. Additionally, some network operators do not expose some neighbor cells explicitly in SIB messages. Thus, simply relying on static values of SIB messages may cause a wireless device to falsely declare a cell to be fake.

Various embodiments provide methods, and wireless devices configured to perform the methods, of mitigating fake cell imprisonment while minimizing impacts on the user experience. Various embodiments enable a wireless device to determine that a fake cell or fake base station is performing operations to prevent a wireless device from performing cell reselection away from the fake cell or fake base station (e.g., fake cell "imprisonment"), and enable the wireless device to perform operations to mitigate the "imprisonment" by the fake cell.

Various embodiments may include operations performed by a processor of a wireless device, including determining a threat score for a first cell when the wireless device performs cell selection or reselection to the first cell. When the threat score for the first cell is below a first threat score threshold indicative of a trustworthy cell, the processor may update a "good neighbor cell data structure" in the wireless device using neighbor cell information from the first cell. The good neighbor cell data structure may include a list of neighbor cells that have been identified by the processor, as well as a location of each neighbor cell and a time when each neighbor cell was updated in the good neighbor cell data structure. When the wireless device performs cell reselection to a second cell, such as the result of moving out of a previous cell, the processor may determine whether the second cell transmits a SIB message including fake neighbor cell information. For example, the good neighbor cell data structure may include an indication of one or more good neighbor cells that are within a location threshold and that were added to or updated in the database within a time threshold. Using this information, the processor may increase a threat score for the second cell in response to determining that the second cell provides the SIB message indicating fake neighbor cell information and that the good neighbor cell data structure includes an indication of one or more good neighbor cells that are within the time threshold and the location threshold.

In some embodiments, the wireless device may execute a threat detection algorithm that is configured to use various types of information to dynamically scale up or down a threat score for an observed cell or base station. An example of information that a threat detection algorithm may consider in dynamically adjusting a threat score of is a system information broadcast by an observed purported base station, such as the Cell ID, the location area code (LAC), the tracking area code (TAC), Evolved UMTS Terrestrial Radio Access (UTRA) Absolute Radio Frequency Channel Number (EARFCN), etc. Further examples of information that a threat detection algorithm may consider in dynamically adjusting a threat score are the protocol interaction and activities (e.g., ID request, RRC Reject, TAC Reject) between the wireless device and the observed device. Another example of information that a threat detection algorithm may consider in dynamically adjusting a threat score is the contextual and environmental information in which the wireless device is operating when the activities between the wireless device and the observed device occur. In some embodiments, the wireless device may compare a determined threat score for a cell to a one or more threat score thresholds and, based on such a comparison, the wireless device may take a corrective action with respect to the cell.

As noted above, the good neighbor cell data structure may include information about one or more neighbor cells, a location of each neighbor cell, and a time when each neighbor cell was updated in the good neighbor cell data structure. In some embodiments, the good neighbor cell data structure may include a database or another suitable data structure. In some embodiments, the good neighbor cell data structure may include information about neighbor cells obtained from a first cell. In some embodiments, the wireless device may perform an authentication procedure for the first cell when the wireless device performs cell selection to the first cell, and may update the good neighbor cell data structure using the neighbor cell information from the first cell in response to determining that the first cell has passed the authentication procedure.

However, in some situations, the authentication procedure may not be available to the wireless device. For example, when performing cell selection in an idle mode of operation, the wireless device may not perform operations including an authentication procedure, such as an Attach procedure or another suitable procedure. In such cases, the wireless device may determine a threat score for the cell, and in response to determining that a threat score determined for the cell is below a threshold (indicating that the cell is trustworthy and that neighbor cell information transmitted by the cell is reliable), the wireless device may update the good neighbor cell data structure with information from the cell without performing an authentication procedure with the cell. In some embodiments, the wireless device may determine whether a cell provides neighbor cell information in one or more SIB messages. In some embodiments, the wireless device may determine whether the second cell provides a SIB-4 message that indicates no intra-frequency neighbor cells are available. In some embodiments, the wireless device may determine whether the second cell provides a SIB-5 message that indicates an unsupported neighbor cell frequency band.

In some embodiments, the wireless device may maintain two data structures, the good neighbor cell data structure, and a separate data structure of candidate cells for cell selection (referred to herein as a "candidate cell data structure"). In some embodiments, the candidate cell data structure may be maintained by a modem or modem processor, such as an ML1 database maintained by an ML1 layer in the modem. In some embodiments, the good neighbor cell data structure may be maintained by a higher layer than the ML1 layer in the modem. In some embodiments, the good neighbor cell data structure and the candidate cell data structure may communicate via an intermediate layer, such as a Radio Resource Control (RRC) layer.

In some embodiments, the good neighbor cell data structure may interact with, or serve as a function or aspect of, the threat score algorithm In some embodiments, the good neighbor cell data structure may include an indication that a cell has passed an authentication procedure. In some embodiments, the good neighbor cell data structure may be updated based on neighbor cell information transmitted from a cell, such as in a SIB message. In some embodiments, the wireless device may append the good neighbor cell data structure with information from the candidate cell data structure. In some embodiments, the wireless device may add information to the candidate cell data structure from the good neighbor cell data structure.

In some embodiments, the good neighbor cell data structure may be created and/or updated by directly reading from the SIBs of a legitimate cell, such as a cell that has been determined to be legitimate which may have very low threat score determined by the threat score algorithm, or which may have passed an authentication procedure. Also or alternatively, the good neighbor cell data structure may be created and/or updated by querying information from the candidate cell data structure when the wireless device is camped on a legitimate cell. In some embodiments, the good neighbor cell data structure may effectively include a filtered version of viable candidate neighbor cells with the information that is gathered either from SIBs or the candidate cell data structure when the wireless devices is camped on a legitimate cell.

In some embodiments, the candidate cell data structure may include neighbor cells or candidate cells for cell selection/reselection that are found by the modem during a cell search process, such as based on received signal strength and/or received signal quality measurements of cell signals. As further described below, the wireless device may deprioritize a cell in the candidate cell data structure as part of a method of mitigating risks posed by a fake cell. In some embodiments, the threat score algorithm may cause deprioritization of a cell in the candidate cell data structure by issuing a call or another suitable message to the candidate cell data structure. In some embodiments, in response to deprioritizing a cell, the modem may perform a search for candidate cells for cell reselection. In some embodiments, such a search may be limited to inter-frequency bands and intra-frequency bands that are supported by (e.g., usable by) the wireless device.

In some embodiments, the wireless device may test information in the good neighbor cell data structure for spatial and temporal relevance and/or reliability. In some embodiments, the wireless device may use neighbor cell information in the good neighbor cell data structure if the neighbor cell information is more recent than a time threshold, and if the neighbor cell information is related to a neighbor cell that is within a location (or distance) threshold from the current location of the wireless device. For example, as noted above, the wireless device may increase a threat score for the second cell in response to determining that the second cell provides the SIB message indicating that no neighbor cells are available, and that the good neighbor cell data structure includes an indication of one or more neighbor cells that are within the time threshold and the location threshold. The distance and time threshold may be adjustable and may depend on the average values of the size (e.g., diameter/radius, area/shape, in units like kilometers or latitude/longitudes) of the cell in the current geographical area for the operator and whether the wireless device is mobile or stationary, and, if mobile, the speed and direction of movement. In a dense city, the distance and the time threshold may be small since cells are deployed densely. In a remote area, the distance and the time threshold may be large since a single cell can be used to cover a large area.

In some embodiments, the wireless device may determine whether the second cell transmits a SIB message indicating a neighbor cell frequency that matches a frequency supported by a neighbor cell indicated in the good neighbor cell data structure that is within the time threshold and the location threshold. For example, the second cell may transmit a SIB-5 message that indicates one or more neighbor cell frequencies. If the second cell is a fake cell, it may transmit unsupported or unusable frequencies that the wireless device is unable to use for cell reselection away from the fake cell. In some embodiments, the wireless device may use neighbor cell information in the good neighbor cell data structure to check neighbor cell frequencies transmitted by the second cell. In some embodiments, the wireless device may increase the threat score for the second cell in response to determining that the second cell transmits a SIB message indicating no neighbor cell frequency that matches a frequency supported by a neighbor cell indicated in the good neighbor cell data structure that is within the time threshold and the location threshold.

In some embodiments, determining a threat score for a first cell when the wireless device performs cell selection or reselection to the first cell may include performing an authentication procedure for the first cell when the wireless device performs cell selection or reselection to the first cell.

As used herein, the term "cell reselection" occurs when the wireless device is still camped on a cell (e.g., the second cell in some embodiments) and tries to find another cell that is better than the current cell to camp on. Thus, in a reselection case the wireless device is still camped on a cell. As used herein, the term "cell selection" occurs when the wireless device has already disconnected from a cell and is not camped on any cell. This may occur when the wireless device goes out-of-service as may happen due to a cell bar in which the wireless device immediately disconnects from the barred cell and starts a full search and conducts a cell selection process.

In some embodiments, updating the good neighbor cell data structure in the wireless device using neighbor cell information from the first cell in response to determining that the threat score for the first cell is below the first threat score threshold may include updating the good neighbor cell data structure using the neighbor cell information from the first cell in response to determining that the first cell has passed the authentication procedure.

In some embodiments, the good neighbor cell data structure may include one or more frequencies supported by each neighbor cell. Such embodiments may further include determining whether the second cell transmits a SIB message indicating a neighbor cell frequency and identifier that match a frequency and identifier supported by a neighbor cell indicated in the good neighbor cell data structure that is within the time threshold and the location threshold, and increasing the threat score for the second cell in response to determining that the second cell transmits a SIB message indicating no neighbor cell frequency and identifier that match a frequency and identifier supported by a neighbor cell indicated in the good neighbor cell data structure that is within the time threshold and the location threshold.

In some embodiments, the wireless device may perform operations to address "cell imprisonment" by a potentially fake cell. Some embodiments may include determining whether the threat score for the second cell exceeds a second threat score threshold, deprioritizing the second cell to place the second cell last in the candidate cell data structure in response to determining that the threat score for the second cell exceeds the second threat score threshold, determining whether the candidate cell data structure has been updated with a new candidate cell for cell reselection within a first time interval in response to deprioritizing the second cell, determining whether the wireless device supports a neighbor cell inter-frequency band provided in the SIB message from the second cell within the first time interval, and performing a very-short-duration cell bar of the second cell for a second time interval in response to determining that the wireless device does not support (e.g., the wireless device cannot communicate on) a neighbor cell inter-frequency band provided in the SIB message from the second cell. This results in the wireless device performing a full search (e.g., a full frequency search, not limited to information provided in SIB message(s)) for a candidate cell for cell selection during the second time interval. In some embodiments, the second threat score threshold may be higher than the first threat score threshold. In some embodiments, the wireless device may query the modem (e.g., the ML1 layer of the modem) to determine whether the wireless device supports a neighbor cell inter-frequency band provided in the SIB message from the second cell. In some embodiments, the very-short-duration cell bar may not trigger the modem to perform a full frequency search, in contrast with a full cell bar, which may trigger the modem to perform a full frequency search if the duration of the cell bar causes the wireless device to go out of service. In some embodiments, the very-short-duration cell bar may be performed for a brief time interval (the second time interval), which may be for a period of a few seconds (e.g., 5 seconds).

In some embodiments, in response to deprioritizing the second cell, the modem may perform a search that is less than a full search (e.g., less than a full frequency search) for new candidate cells for cell reselection. In some embodiments, the search triggered by deprioritizing the second cell may search neighbor cells indicated by information in one or more SIB messages.

A full search is typically performed when the wireless device is booting up and trying to find the very first cell to set up cellular communication. A full search may also be performed when a cell bar happens and the wireless device is not camped on any cell, or when the wireless device goes into the idle mode and RRC is disconnected such that the wireless device is not camped on any cell. In these cases, to connect to a base station to receive cellular service, the wireless device performs a full search on all supported frequency bands listed in its universal subscriber identity module (USIM). The USIM provided by the operator lists all frequency bands that the operator service will support. A full search of all listed frequencies is needed because the wireless device has no better information about the frequency bands that are available at the wireless device's location. Thus, forcing a cell bar leads to a full search, because the wireless device becomes disconnected from the current camped cell.

A limited search may be done when the wireless device receives some inputs on the frequency bands that can be searched. In a limited search, the wireless device will search a subset of the frequency bands listed in the USIM. For example, frequency band information may be provided in some of the SIBs of the current camped cell (SIB4, SIB5). This may be possible during deprioritization of a cell because the camped cell's SIBs provide the frequency band information. This procedure may be used by a fake cell to trick wireless devices to remain with the fake cell (thus "imprisoning" the wireless device) when deprioritized. In some embodiments, the "good Neighbor cell data structure" may provide a set of frequency bands that have been verified to be supported by USIM to trigger a limited search.

In some embodiments, the very-short-duration cell bar may cause the wireless device to lose a communication link with the communication network for a period of a few seconds (e.g., 5 seconds). However, the effect of the very-short-duration cell bar on network service availability is relatively small. Further, the very-short-duration cell bar enables the wireless device to search for neighbor cells (e.g., neighbor cells in all supported inter-frequency together also intra-frequency bands) that may not be indicated in a SIB message, including recently found good neighbor cells, such as recently seen cells that are within a time threshold and a distance threshold.

Some embodiments may include initializing a timer in response to deprioritizing the second cell to place the second cell last in the candidate cell data structure, determining whether the new candidate cell for cell reselection satisfies a cell reselection criterion in response to determining that the candidate cell data structure has been updated with a new cell reselection candidate cell, and performing the very-short-duration cell bar of the second cell for the second time interval when the timer expires in response to determining that the new candidate cell for cell reselection does not satisfy the cell selection criterion. In some embodiments, if the information in the candidate cell data structure continues to indicate no available neighbor cells and continues to indicate no available frequencies for inter-frequency cell reselection, the wireless device may perform the very-short-duration cell bar after a timer expires following the deprioritizing of the second cell. For example, it is highly likely that a fake cell that intends to imprison will use a different frequency band than used by other cells in the region. If a candidate cell is added to the candidate cell data structure (e.g., because the modem received information about the in a SIB message), it is likely that the candidate cell is an intra-frequency neighbor cell or an inter-frequency neighbor cell (e.g., properly listed in a SIB-5 message). The wireless device may determine that the presence of a legitimate neighbor cell in the candidate cell data structure reduces the likelihood that the second cell is a fake cell attempting to imprison the wireless device, and that remaining camped on the deprioritized cell may be acceptable.

In some embodiments, determining whether the new candidate cell for cell reselection satisfies the cell reselection criterion in response to determining that the candidate cell data structure has been updated with a new candidate cell for cell reselection may include determining whether the wireless device supports a neighbor cell inter-frequency band provided in the SIB message from the second cell within the first time interval. In embodiments, the cell reselection criterion may include one or more thresholds for cell reselection. In some embodiments, the cell reselection criterion may include one or more signal strength or signal quality measurements of a candidate cell performed by the wireless device that exceed a signal strength or signal quality threshold.

Some embodiments may include performing cell reselection to one of the neighbor cells indicated in the good neighbor cell data structure that are within the time threshold and the location threshold, determining whether the wireless device is repeatedly performing cell reselection to the second cell and the one of the neighbor cells indicated in the good neighbor cell data structure, and performing the very-short-duration cell bar of the second cell for the second time interval in response to determining that the wireless device is repeatedly performing cell reselection to the second cell and the one of the neighbor cells indicated in the good neighbor cell data structure. For example, the wireless device may determine that it is performing cell reselection back-and-forth (e.g., "ping ponging") between the second cell and one of the neighbor cells indicated in the good neighbor cell data structure, and may perform a very-short-duration cell bar of the second cell to enable the wireless device to break free of the second cell and perform a full search for cell selection on any supported frequency bands.

As noted above, the wireless device may perform a full search for a candidate cell for cell selection during the second time interval, such as when the wireless device is performing the very-short-duration cell bar of the second cell. In some embodiments, the wireless device may provide the modem with additional information as a "hint" or "suggestion" to improve the search. In some embodiments, the additional information may be passed from the good neighbor cell data structure to the candidate cell data structure. In some embodiments, the good neighbor cell data structure may pass information, such as a "LastKnownGoodCell," to the candidate cell data structure. In some embodiments, performing a full search for a candidate cell for cell selection during the second time interval may include adding the one or more neighbor cells indicated in the good neighbor cell data structure to the candidate cell data structure, and performing the full search for the candidate cell for cell selection using the candidate cell data structure including the added one or more neighbor cells indicated in the good neighbor cell data structure.

In some embodiments, performing a full search for a candidate cell for cell selection during the second time interval may include selecting one of the neighbor cells indicated in the good neighbor cell data structure, and performing targeted cell acquisition to the selected one of the good neighbor cells indicated in the good neighbor cell data structure (e.g., as a "hint" or "suggestion" to improve the search). Some embodiments may include determining whether the targeted cell acquisition to the selected one of the neighbor cells indicated in the good neighbor cell data structure was successful, and triggering an out-of-service condition and performing a full search for a candidate neighbor cell in response to determining that the targeted cell acquisition to the selected one of the neighbor cells indicated in the good neighbor cell data structure was not successful.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of wireless devices (illustrated as wireless devices 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), an NR base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (e.g., relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc. A wireless device 120a, 120b, 120c may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 110a may communicate with the communication network 140 over a wired or wireless communication link 126. The wireless devices 120a, 120b, 120c may communicate with a base station 110a-110d over a wireless communication link 122.

The base station 110a-110d may communicate with the core network 140 over a wired or wireless communication link 126. The wireless device 120a-120e may communicate with the base station 110a-110d over a wireless communication link 122.

Wired communication links may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE). In some embodiments, the wireless communication links 122 and 124 may include direct connection communication links that may be established over a PC5 interface in accordance with applicable 3GPP standards.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as an NR or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more wireless devices (for example, illustrated as the wireless device 120a and the wireless device 120e) may communicate directly using one or more sidelink channels, for example, without using a base station 110a-110d as an intermediary to communicate with one another. For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, a vehicle-to-pedestrian (V2P) protocol, or similar protocol), a mesh network, or similar networks, or combinations thereof. In this case, the wireless devices 120a-120e may perform scheduling operations, resource selection operations, as well as other operations described elsewhere herein as being performed by the base station 110a-110d.

In some implementations, the communication system 100 may include one or more devices configured to communicate as part of an intelligent transportation system (ITS). ITS technologies may increase intercommunication and safety for driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines transmission modes that provide non-line-of-sight awareness and a higher level of predictability for enhanced road safety and autonomous driving. Such C-V2X transmission modes may include V2V, V2I, and V2P, and may utilize frequencies in a 5.9 gigahertz (GHz) spectrum that is independent of a cellular network. C-V2X transmission modes may also include vehicle-to-network communications (V2N) in mobile broadband systems and technologies, such as 3G mobile communication technologies (e.g., GSM evolution (EDGE) systems, CDMA 2000 systems, etc.), 4G communication technologies (e.g., LTE, LTE-Advanced, WiMAX, etc.), as well as 5G systems.

Figure 2:
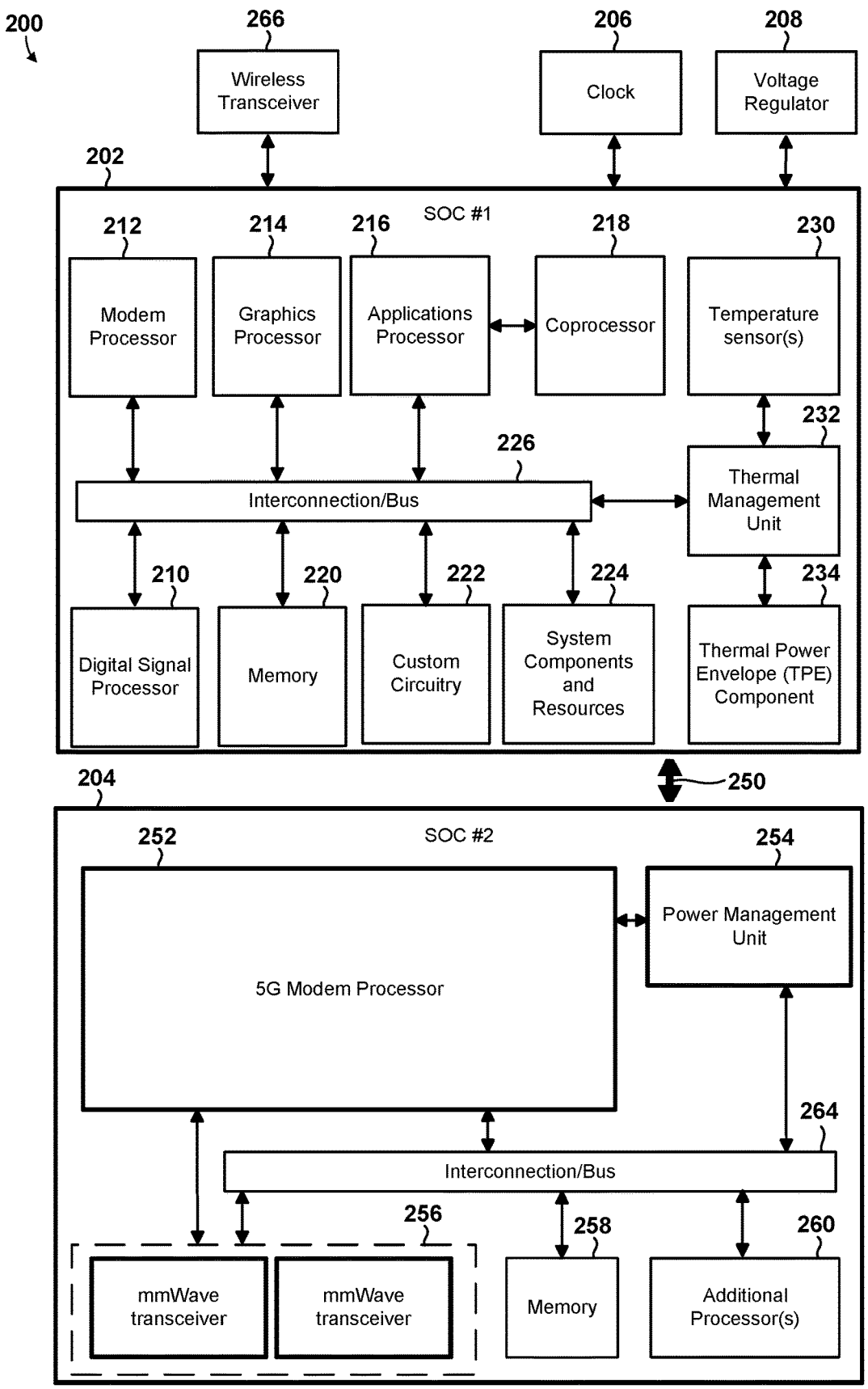
FIG. 2 is a component block diagram illustrating wireless device components suitable for implementing any of the various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing various embodiments.

With reference to FIGS. 1 and 2, the illustrated example computing system 200 (which may be an SIP in some implementations) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of a wireless device (e.g., the wireless devices 120a-120e) that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
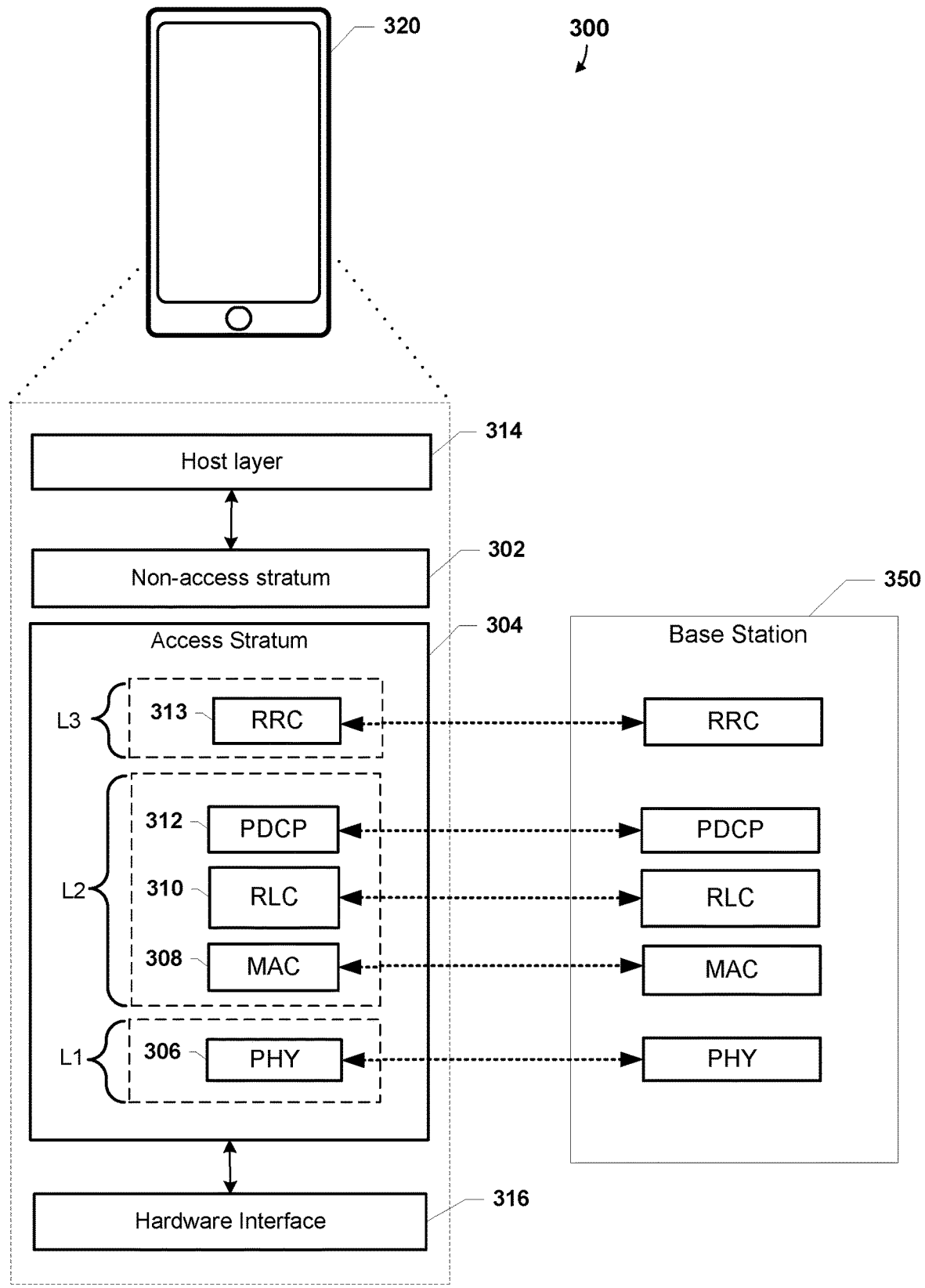
FIG. 3 is a diagram illustrating an example of a software architecture including a radio protocol stack for the user and control planes in wireless communications suitable for implementing any of the various embodiments.

FIG. 3 illustrates an example of a software architecture 300 including a radio protocol stack for the user and control planes in wireless communications between a base station 350 (e.g., the base station 110a) and a wireless device 320 (e.g., the wireless devices 120a-120e, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-subscriber identity module (SIM) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the physical downlink control channel (PDCCH) and the physical downlink shared channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
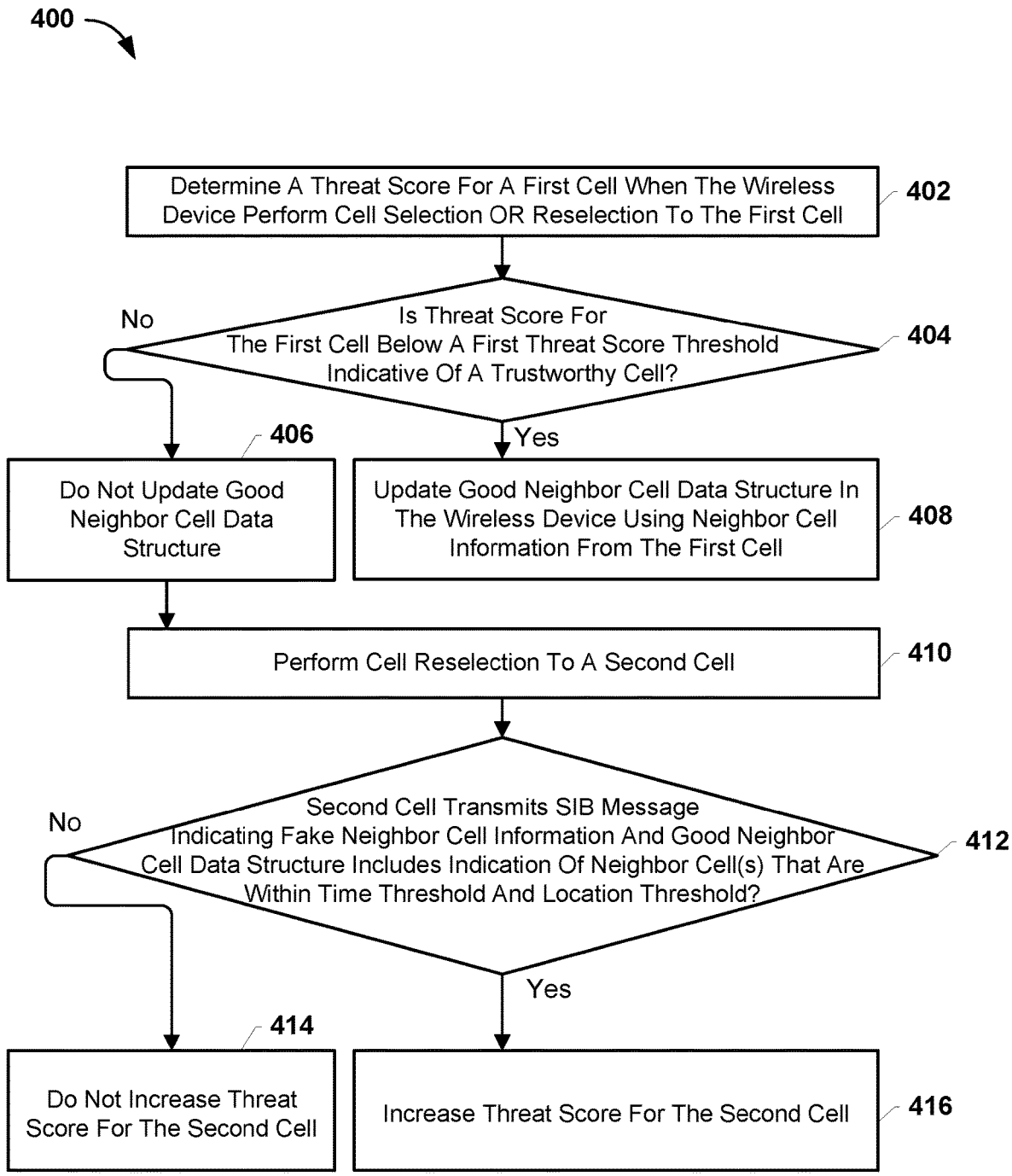
FIG. 4 is a process flow diagram illustrating a method performed by a processor of a wireless device for mitigating fake cell imprisonment in accordance with various embodiments.

FIG. 4 illustrates a method 400 that may be performed by a processor of a wireless device for mitigating fake cell imprisonment according to various embodiments. With reference to FIGS. 1-4, the method 400 may be implemented in hardware components and/or software components of a wireless device (e.g., the wireless device 120a-120e, 200, 320), the operation of which may be controlled by one or more processors (e.g., the processors 212, 214, 216, 218, 252, and 260) of the wireless device.

In block 402, the processor may determine a threat score for a first cell when the wireless device performs cell selection or reselection to the first cell. Depending on the circumstances, the wireless device may perform cell selection or cell reselection to the first cell. For ease of reference, the term "cell selection" is used herein to refer to the first cell, even though the wireless device could have camped on the first cell either through cell selection or cell reselection. Means for performing functions of the operations in block 402 may include the processor (e.g., 212, 214, 216, 218, 252, and 260).

In determination block 404, the processor may determine whether the threat score for the first cell is below a first threat score threshold indicative of a trustworthy cell. For example, the processor may increase a threat score for the second cell in response to determining that the second cell provides a SIB message indicating fake neighbor cell information and that the good neighbor cell data structure includes an indication of one or more good neighbor cells that are within the time threshold and the location threshold. In some embodiments, the wireless device may execute a threat detection algorithm that is configured to use various types of information to dynamically scale up or down a threat score for an observed cell or base station. Examples of information that a threat detection algorithm may consider in dynamically adjusting a threat score may include information in a SIB, such as the Cell ID, the LAC, the TAC, an EARFCN, interactions between the wireless device and the observed device, such as an ID request, an RRC Reject, a TAC Reject, and contextual and environmental information in which the wireless device is operating when the activities between the wireless device and the observed device occur. Means for performing functions of the operations in determination block 404 may include the processor (e.g., 212, 214, 216, 218, 252, and 260).

In response to determining that the threat score for the first cell is not below a first threat score threshold indicative of a trustworthy cell (i.e., determination block 404="No"), the processor may not update a good neighbor cell data structure using the neighbor cell information from the first cell in block 406. Means for performing functions of the operations in block 406 may include the processor (e.g., 212, 214, 216, 218, 252, and 260).

In response to determining that the threat score for the first cell is below a first threat score threshold indicative of a trustworthy cell (i.e., determination block 404="Yes"), the processor may update the good neighbor cell data structure in the wireless device using neighbor cell information from the first cell in response to determining that the threat score for the first cell is below the first threat score threshold in block 408. In various embodiments, the good neighbor cell data structure may include one or more neighbor cells, a location of each neighbor cell, and a time when each neighbor cell was updated in the good neighbor cell data structure. Means for performing functions of the operations in block 408 may include the processor (e.g., 212, 214, 216, 218, 252, and 260).

In block 410, the processor may perform cell reselection to a second cell. Means for performing functions of the operations in block 410 may include the processor (e.g., 212, 214, 216, 218, 252, and 260) and a wireless transceiver (e.g., 256, 266).

In determination block 412, the processor may determine whether the second cell exhibits indications of being a fake cell by transmitting a system information block (SIB) message indicating fake neighbor cell information when the good neighbor cell data structure includes an indication of one or more good neighbor cells that are within a time threshold and a location threshold. In some embodiments, the processor may determine whether the second cell provides a SIB message that indicates no intra-frequency neighbor cells are available or an Intra-frequency not allowed to reselect indication. In some embodiments, the processor may determine whether the second cell provides a SIB message that indicates a neighbor cell frequency band that is unusable by the wireless device. Means for performing functions of the operations in determination block 412 may include the processor (e.g., 212, 214, 216, 218, 252, and 260) and the wireless transceiver (e.g., 256, 266).

In response to determining that the second cell is not exhibiting indications of being a fake cell because it is not transmitting a SIB message indicating fake neighbor cell information and/or that the good neighbor cell data structure includes an indication of one or more good neighbor cells that are within a time threshold and a location threshold (i.e., determination block 412="No"), the processor may not increase a threat score for the second cell in block 414. In other words, if the processor does not detect signs that the second cell is a fake cell, the processor will leave the threat score for the cell unchanged. Means for performing functions of the operations in block 414 may include the processor (e.g., 212, 214, 216, 218, 252, and 260).

In response to determining that the second cell is exhibiting indications of being a fake cell because it transmits SIB messages indicating fake neighbor cell information and when the good neighbor cell data structure includes an indication of one or more good neighbor cells that are within the time threshold and the location threshold (i.e., determination block 412="Yes"), the processor may increase a threat score for the second cell in block 416. In other words, if the processor detects signs that the second cell is a fake cell, the processor may increase the threat score for the cell. Means for performing functions of the operations in block 416 may include the processor (e.g., 212, 214, 216, 218, 252, and 260).

FIGS. 5A-5G illustrate operations 500a-500g that may be performed by a processor of a wireless device as part of the method 400 for mitigating fake cell imprisonment according to various embodiments. With reference to FIGS. 1-5G, the operations 500a-500g may be implemented in hardware components and/or software components of a wireless device (e.g., the wireless device 120a-120e, 200, 320), the operation of which may be controlled by one or more processors (e.g., the processors 212, 214, 216, 218, 252, and 260) of the wireless device.

Figure 5A:
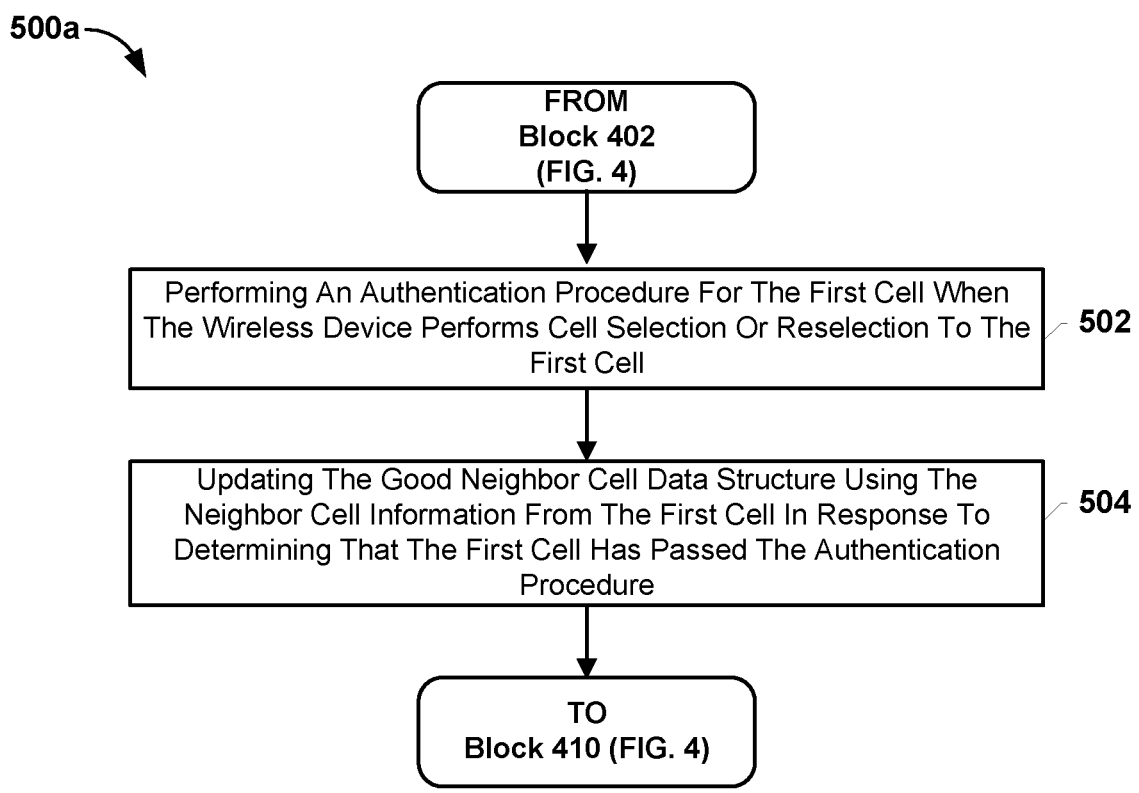
FIGS. 5A-5G are process flow diagrams illustrating operations that may be performed as part of methods for mitigating fake cell imprisonment in accordance with various embodiments.

Referring to FIG. 5A, following the performance of the operations of block 402 of the method 400 (FIG. 4), the processor may perform an authentication procedure for the first cell when the wireless device performs cell selection or reselection to the first cell in block 502. Means for performing functions of the operations in block 502 may include the processor (e.g., 212, 214, 216, 218, 252, and 260) and the wireless transceiver (e.g., 256, 266).

In block 504, the processor may update the good neighbor cell data structure using the neighbor cell information from the first cell in response to determining that the first cell has passed the authentication procedure. Means for performing functions of the operations in block 504 may include the processor (e.g., 212, 214, 216, 218, 252, and 260).

The processor may then perform the operations of block 410 of the method 400 (FIG. 4) as described.

Figure 5B:
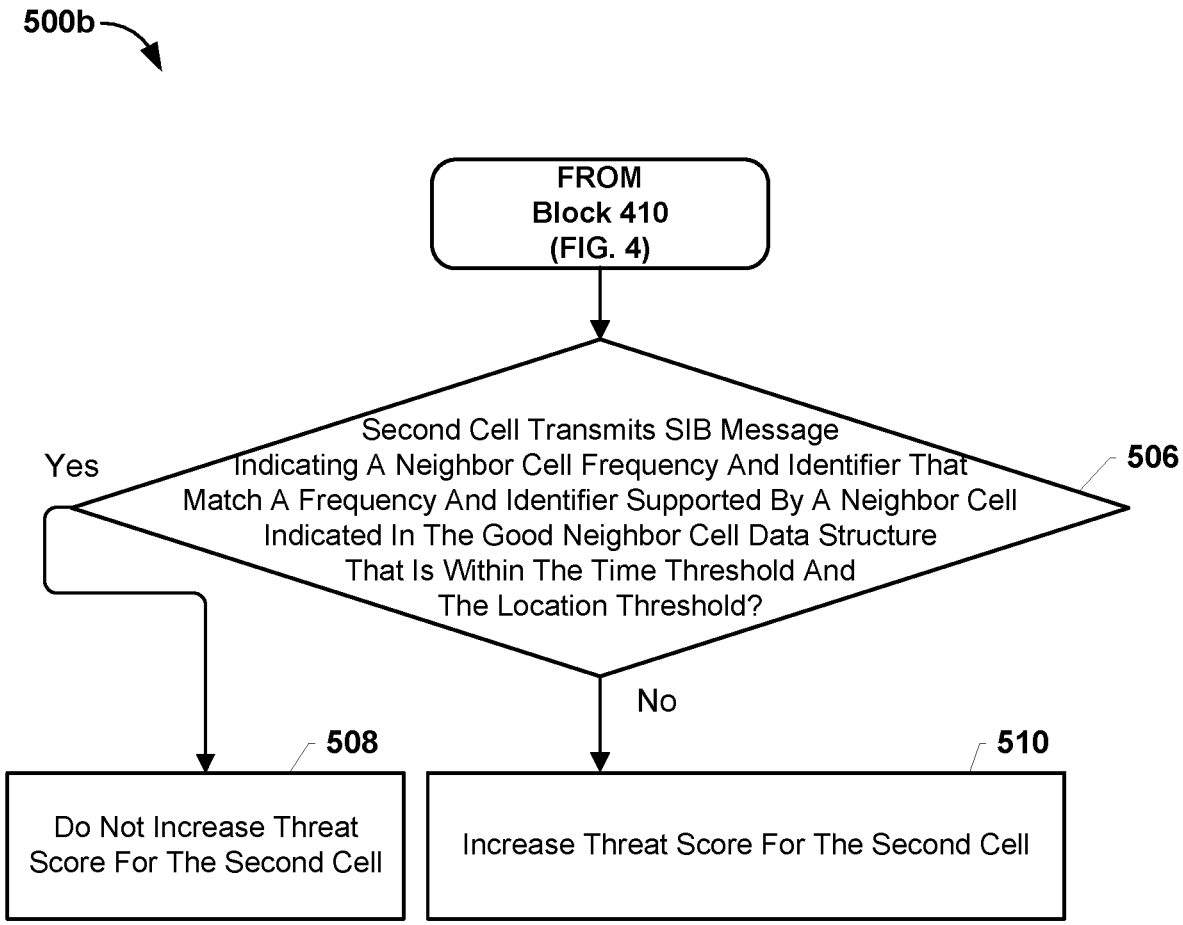

Referring to FIG. 5B, following the performance of the operations of block 402 of the method 400 (FIG. 4), the processor may determine whether the second cell transmits a SIB message indicating a neighbor cell frequency and identifier that match a frequency and identifier supported by a neighbor cell indicated in the good neighbor cell data structure that is within the time threshold and the location threshold in determination block 506. Means for performing functions of the operations in determination block 506 may include the processor (e.g., 212, 214, 216, 218, 252, and 260) and the wireless transceiver (e.g., 256, 266).

In response to determining that the second cell transmits a SIB message indicating a neighbor cell frequency and identifier that match a frequency and identifier supported by a neighbor cell indicated in the good neighbor cell data structure that is within the time threshold and the location threshold (i.e., determination block 506="Yes"), the processor may not increase a threat score for the second cell in block 508. Means for performing functions of the operations in block 508 may include the processor (e.g., 212, 214, 216, 218, 252, and 260).

In response to determining that the second cell does not transmit a SIB message indicating a neighbor cell frequency and identifier that match a frequency and identifier supported by a neighbor cell indicated in the good neighbor cell data structure that is within the time threshold and the location threshold (i.e., determination block 506="No"), the processor may increase a threat score for the second cell in block 510. Means for performing functions of the operations in block 510 may include the processor (e.g., 212, 214, 216, 218, 252, and 260).

Figure 5C:
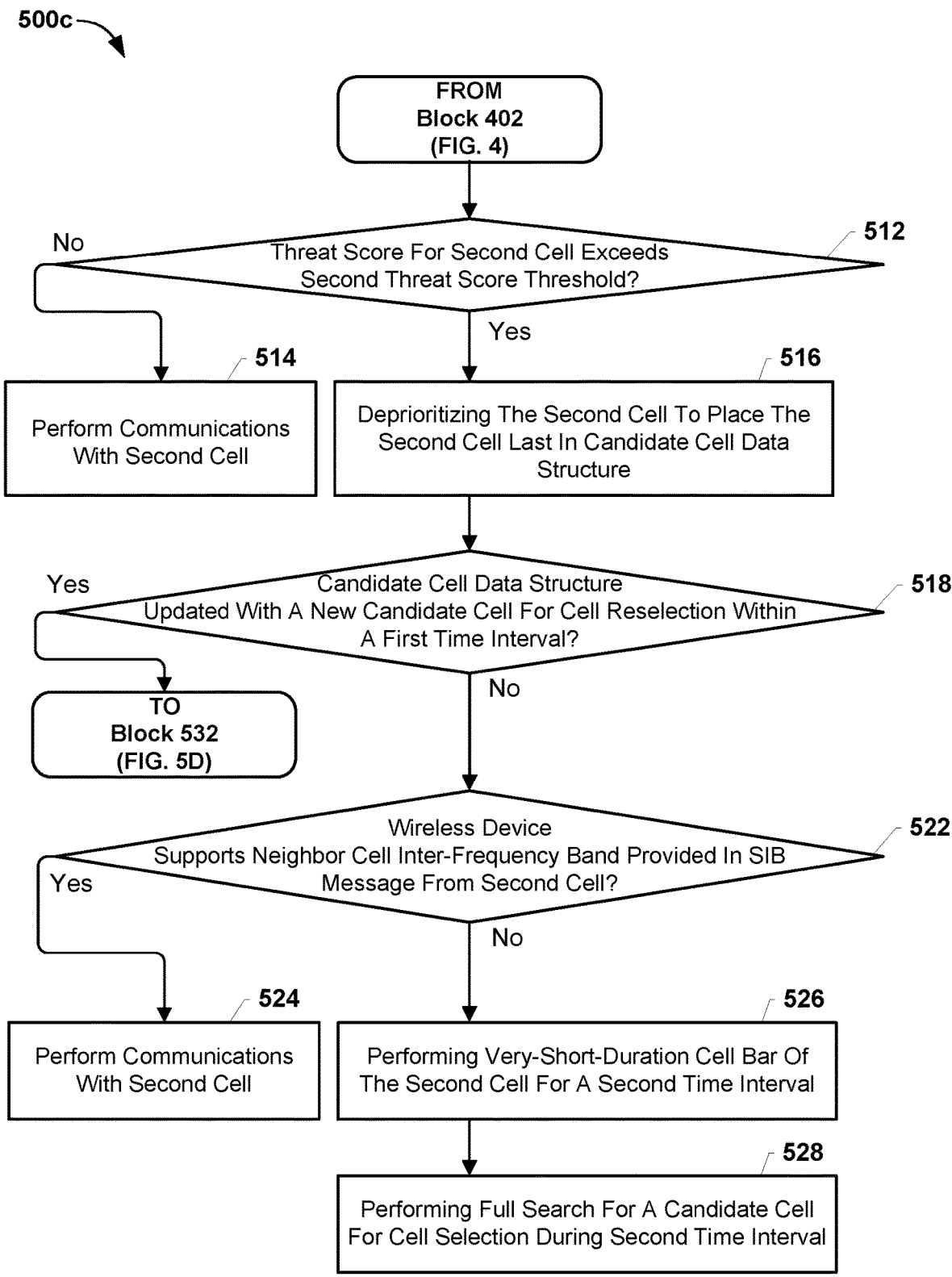

Referring to FIG. 5C, following the performance of the operations of block 402 (FIG. 4), the processor may determine whether the threat score for the second cell exceeds a second threat score threshold in determination block 512. Means for performing functions of the operations in determination block 512 may include the processor (e.g., 212, 214, 216, 218, 252, and 260).

In response to determining that the threat score for the second cell does not exceed the second threat score threshold (i.e., determination block 512="No"), the processor may perform communications with the second cell in block 514. Means for performing functions of the operations in block 514 may include the processor (e.g., 212, 214, 216, 218, 252, and 260) and the wireless transceiver (e.g., 256, 266).

In response to determining that the threat score for the second cell exceeds the second threat score threshold (i.e., determination block 512="Yes"), the processor may deprioritize the second cell to place the second cell last in the candidate cell data structure in block 516. Means for performing functions of the operations in block 516 may include the processor (e.g., 212, 214, 216, 218, 252, and 260).

In determination block 518, the processor may determine whether the candidate cell data structure has been updated with a new candidate cell for cell reselection within a first time interval in response to deprioritizing the second cell. Means for performing functions of the operations in block 518 may include the processor (e.g., 212, 214, 216, 218, 252, and 260).

In response to determining that the candidate cell data structure has been updated with a new candidate cell for cell reselection within a first time interval (i.e., determination block 518="Yes"), the processor may proceed to perform the operations of block 532 (FIG. 5D) as further described below.

In response to determining that the candidate cell data structure has not been updated with a new candidate cell for cell reselection within a first time interval (i.e., determination block 518="No"), the processor may determine whether the wireless device supports a neighbor cell inter-frequency band provided in the SIB message from the second cell within the first time interval in determination block 522. Means for performing functions of the operations in block 522 may include the processor (e.g., 212, 214, 216, 218, 252, and 260).

In response to determining that the wireless device supports a neighbor cell inter-frequency band provided in the SIB message from the second cell (i.e., determination block 522="Yes"), the processor may perform communications with the second cell in block 524. Means for performing functions of the operations in block 524 may include the processor (e.g., 212, 214, 216, 218, 252, and 260) and the wireless transceiver (e.g., 256, 266).

In response to determining that the wireless device does not support a neighbor cell inter-frequency band provided in the SIB message from the second cell (i.e., determination block 522="No"), the processor may perform a very-short-duration cell bar of the second cell for a second time interval in block 526. Means for performing functions of the operations in block 526 may include the processor (e.g., 212, 214, 216, 218, 252, and 260).

In block 528, as a result of the very-short-duration the cell bar the processor may perform a full search for a candidate cell for cell selection during the second time interval. Means for performing functions of the operations in block 528 may include the processor (e.g., 212, 214, 216, 218, 252, and 260) and the wireless transceiver (e.g., 256, 266).

Figure 5D:
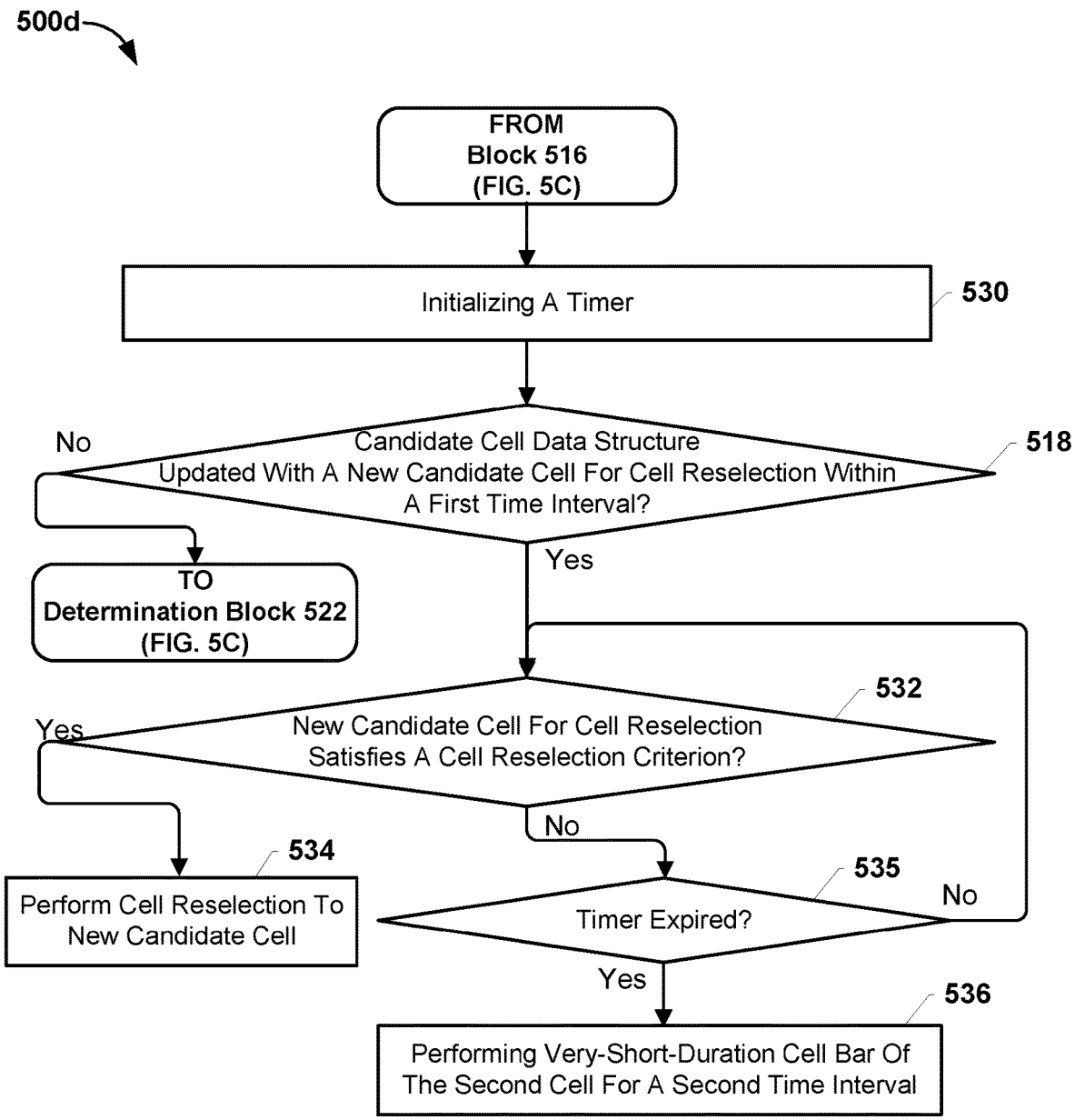

Referring to FIG. 5D, following the performance of the operations in block 516 (FIG. 5C), the processor may initialize a timer in response to deprioritizing the second cell to place the second cell last in the candidate cell data structure in block 530. Means for performing functions of the operations in block 530 may include the processor (e.g., 212, 214, 216, 218, 252, and 260).

The processor may then perform the operations of determination block 518 (FIG. 5C) as described.

In response to determining that the candidate cell data structure has been updated with a new cell selection candidate cell (i.e., determination block 518="Yes"), the processor may determine whether the new candidate cell for cell reselection satisfies the cell reselection criterion in determination block 532. Means for performing functions of the operations in block 532 may include the processor (e.g., 212, 214, 216, 218, 252, and 260).

In response to determining that the new candidate cell for cell reselection satisfies the cell reselection criterion (i.e., determination block 532="Yes"), the processor may perform cell reselection to the new candidate cell in block 534. Means for performing functions of the operations in block 534 may include the processor (e.g., 212, 214, 216, 218, 252, and 260) and the wireless transceiver (e.g., 256, 266).

In response to determining that the new candidate cell for cell reselection satisfies the cell reselection criterion (i.e., determination block 532="No"), the processor may determine whether the time has expired in determination block 535. Means for performing functions of the operations in block 535 may include the processor (e.g., 212, 214, 216, 218, 252, and 260).

In response to determining that the timer has not expired (i.e., determination block 535="No"), the processor may again perform the operations of determination block 532.

In response to determining that the timer has expired (i.e., determination block 535="Yes"), the processor may perform the very-short-duration cell bar of the second cell for the second time interval in block 536. Means for performing functions of the operations in block 536 may include the processor (e.g., 212, 214, 216, 218, 252, and 260).

Figure 5E:
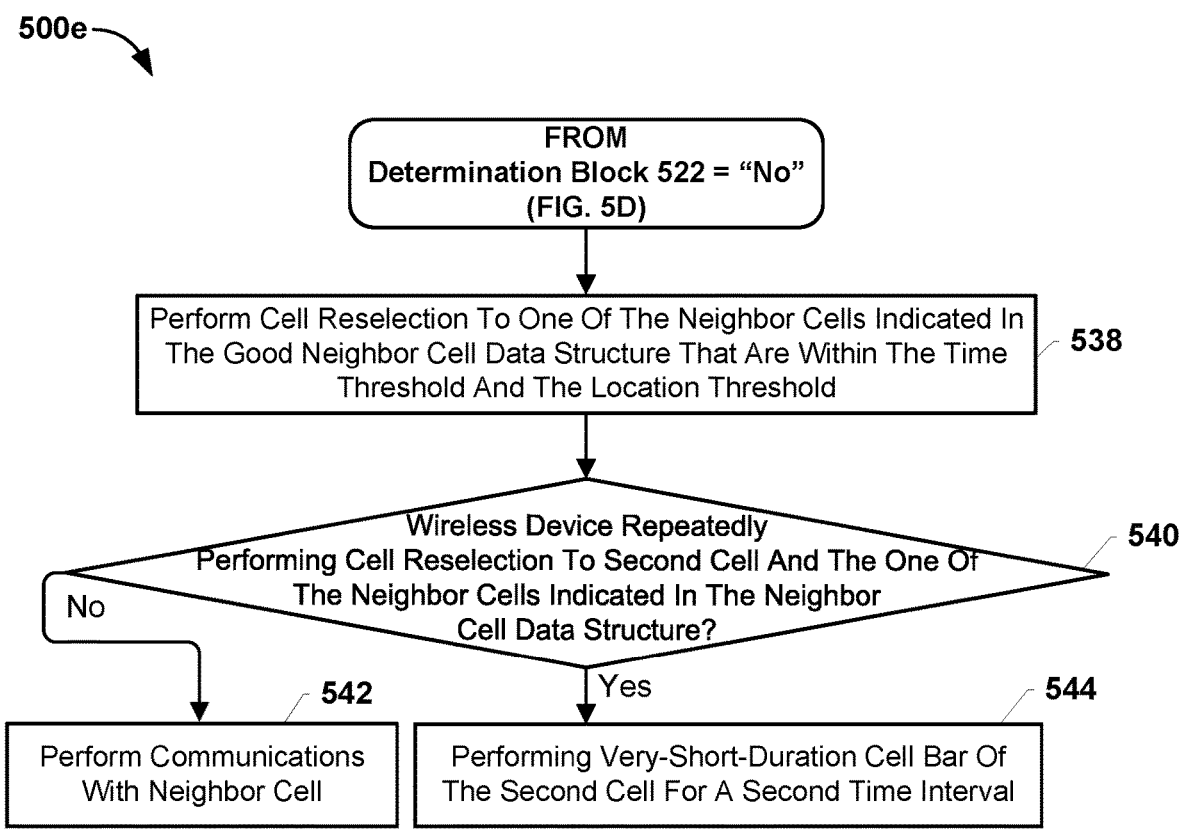

Referring to FIG. 5E, in some embodiments, in response to determining that the wireless device does not support a neighbor cell inter-frequency band provided in the SIB message from the second cell (i.e., determination block 522="No"), the processor may perform cell reselection to one of the neighbor cells indicated in the good neighbor cell data structure that are within the time threshold and the location threshold in block 538. Means for performing functions of the operations in block 538 may include the processor (e.g., 212, 214, 216, 218, 252, and 260) and the wireless transceiver (e.g., 256, 266).

In determination block 540, the processor may determine whether the wireless device is repeatedly performing cell reselection to the second cell and the one of the neighbor cells indicated in the good neighbor cell data structure. Means for performing functions of the operations in determination block 540 may include the processor (e.g., 212, 214, 216, 218, 252, and 260) and the wireless transceiver (e.g., 256, 266).

In response to determining that the wireless device is not repeatedly performing cell reselection to the second cell and the one of the neighbor cells indicated in the good neighbor cell data structure (i.e., determination block 540="No"), the processor may perform communications with the neighbor cell in block 542. Means for performing functions of the operations in block 540 may include the processor (e.g., 212, 214, 216, 218, 252, and 260) and the wireless transceiver (e.g., 256, 266).

In response to determining that the wireless device is repeatedly performing cell reselection to the second cell and the one of the neighbor cells indicated in the good neighbor cell data structure (i.e., determination block 540="Yes"), the processor may perform the very-short-duration cell bar of the second cell for the second time interval in block 544. Means for performing functions of the operations in block 540 may include the processor (e.g., 212, 214, 216, 218, 252, and 260).

Figure 5F:
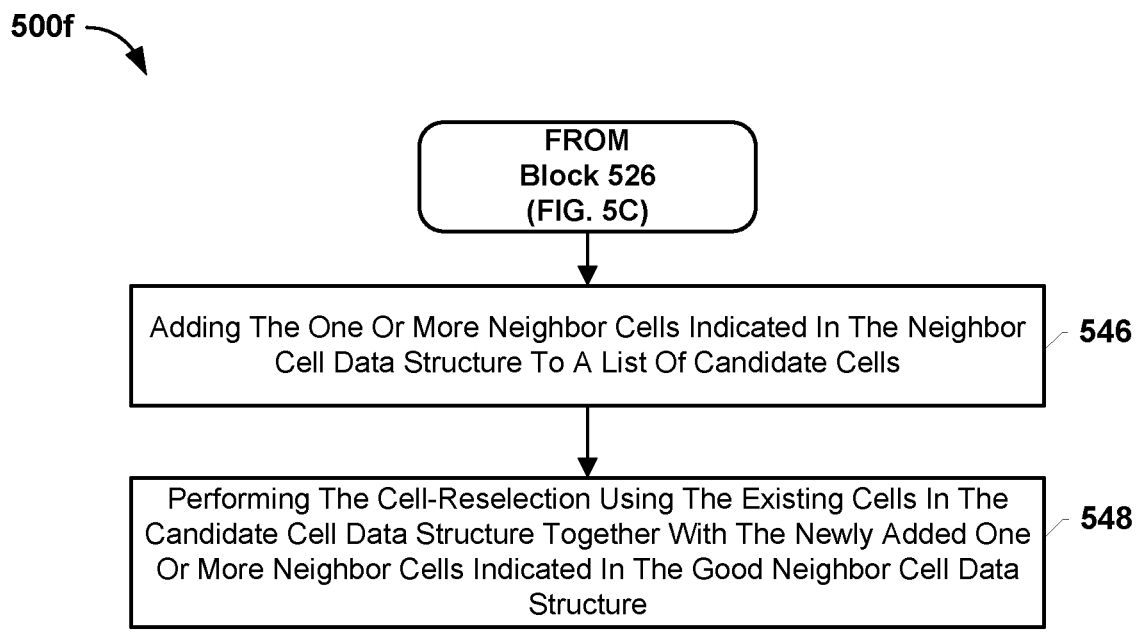

Referring to FIG. 5F, in some embodiments, following the performance of the operations of block 526 (FIG. 5C), the processor may add the one or more neighbor cells indicated in the good neighbor cell data structure to the candidate cell data structure in block 546. Means for performing functions of the operations in block 546 may include the processor (e.g., 212, 214, 216, 218, 252, and 260).

In block 548, the processor may perform the full search for the candidate cell for cell reselection using the candidate cell data structure including the added one or more neighbor cells indicated in the good neighbor cell data structure. Means for performing functions of the operations in block 548 may include the processor (e.g., 212, 214, 216, 218, 252, and 260) and the wireless transceiver (e.g., 256, 266).

Figure 5G:
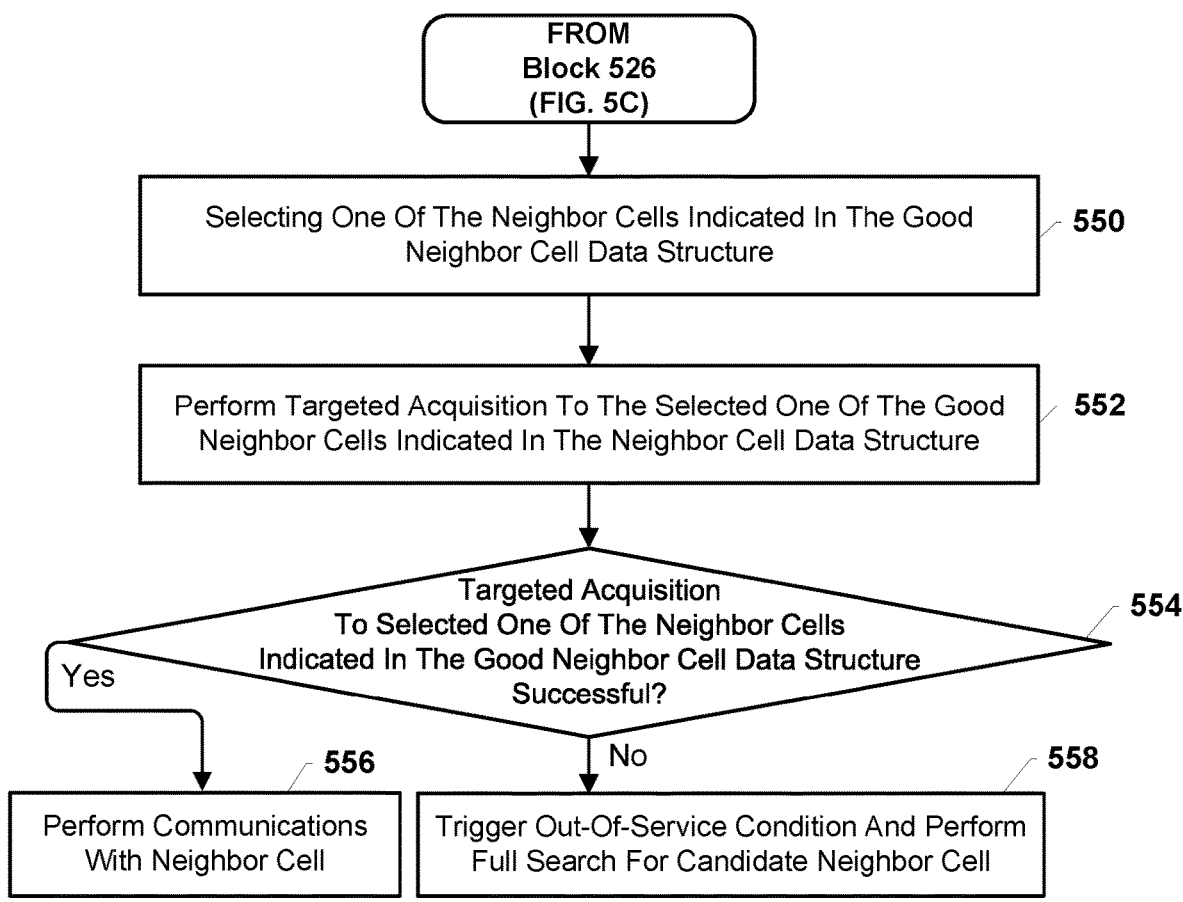

Referring to FIG. 5G, in some embodiments, following the performance of the operations of block 526 (FIG. 5C), the processor may select one of the neighbor cells indicated in the good neighbor cell data structure in block 550. Means for performing functions of the operations in block 550 may include the processor (e.g., 212, 214, 216, 218, 252, and 260).

In block 552, the processor may perform targeted cell acquisition to the selected one of the good neighbor cells indicated in the good neighbor cell data structure. Means for performing functions of the operations in block 552 may include the processor (e.g., 212, 214, 216, 218, 252, and 260) and the wireless transceiver (e.g., 256, 266).

In determination block 554, the processor may determine whether the targeted cell acquisition to the selected one of the neighbor cells indicated in the good neighbor cell data structure was successful. Means for performing functions of the operations in determination block 554 may include the processor (e.g., 212, 214, 216, 218, 252, and 260) and the wireless transceiver (e.g., 256, 266).

In response to determining that the targeted cell acquisition to the selected one of the neighbor cells indicated in the good neighbor cell data structure was successful (i.e., determination block 554="Yes"), the processor may perform communications with the neighbor cell in block 556. Means for performing functions of the operations in block 556 may include the processor (e.g., 212, 214, 216, 218, 252, and 260) and the wireless transceiver (e.g., 256, 266).

In response to determining that the targeted cell acquisition to the selected one of the neighbor cells indicated in the good neighbor cell data structure was not successful (i.e., determination block 554="No"), the processor may trigger an out-of-service condition and perform a full search for a candidate neighbor cell in block 558. In some embodiments, the full search may include a full spectrum search that is not limited to information in the candidate cell data structure, or limited to information received in a SIB message. In most cases the full search will be determined by all the frequency bands supported by the USIM in the wireless device. Means for performing functions of the operations in block 558 may include the processor (e.g., 212, 214, 216, 218, 252, and 260) and the wireless transceiver (e.g., 256, 266).

Figure 6:
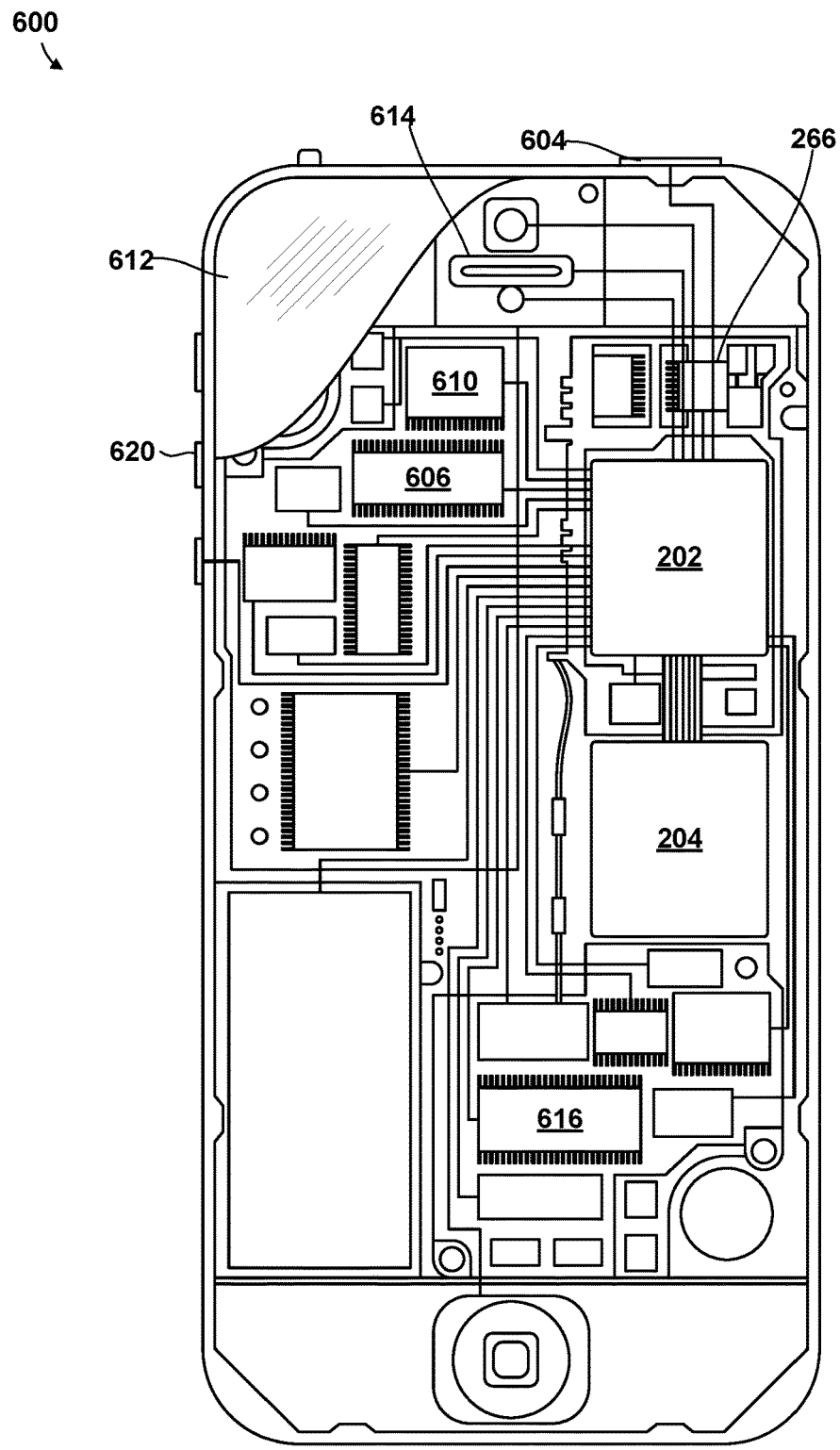
FIG. 6 is a component block diagram of a wireless device suitable for implementing any of the various embodiments.

Various embodiments may be implemented on a variety of wireless devices, an example of which is illustrated in FIG. 6 in the form of a smartphone 600. With reference to FIGS. 1-6, the smartphone 600 (e.g., the wireless devices 120a-120e, 200, 320) may include a first SOC 202 (e.g., a SOC-CPU) coupled to a second SOC 204 (e.g., a 5G capable SOC). The first and second SOCs 202, 204 may be coupled to internal memory 606, 616, a display 612, and a speaker 614. Additionally, the smartphone 600 may include an antenna 604 for sending and receiving electromagnetic radiation that may be connected to a wireless data link and/or cellular telephone transceiver 266 coupled to one or more processors in the first and/or second SOCs 202, 204. Smartphones 600 typically also include menu selection buttons or rocker switches 620 for receiving user inputs.

A typical smartphone 600 also includes a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 610 may include a digital signal processor (DSP) circuit (not shown separately).

Figure 7:
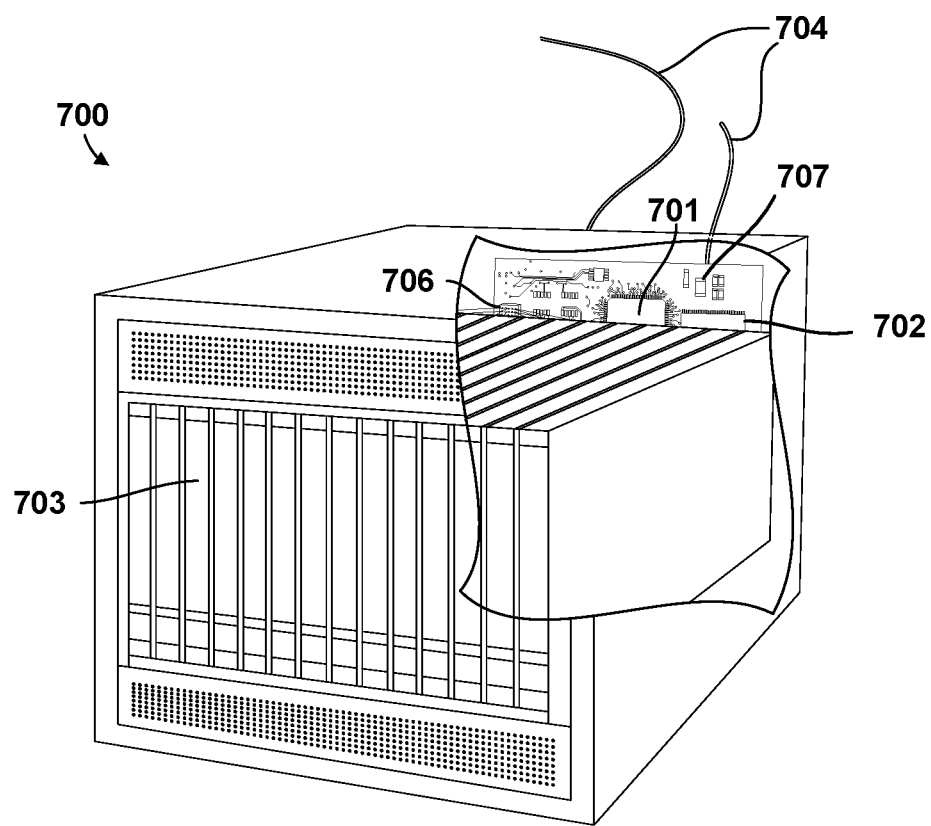
FIG. 7 is a component block diagram of a base station suitable for implementing any of the various embodiments.

Various embodiments may be implemented on a variety of network devices (such as a base station), an example of which is illustrated in FIG. 7 in the form of a network computing device 700 functioning as a network element of a communication network. Such network computing devices may include at least the components illustrated in FIG. 7. With reference to FIGS. 1-7, the network computing device 700 (e.g., the base stations 110a-110d, 350) may typically include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

The processors of the smartphone 600 and the network computing device 700 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 606, 616, 702, 703 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the Claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 400 or the operations 500a-500g may be substituted for or combined with one or more operations of the method 400 or the operations 500a-500g.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for mitigating fake cell imprisonment, comprising:
   determining a threat score for a first cell when the wireless device performs cell selection to the first cell;
   determining whether the threat score for the first cell is below a first threat score threshold indicative of a trustworthy cell;
   updating a good neighbor cell data structure in the wireless device using neighbor cell information from the first cell in response to determining that the threat score for the first cell is below the first threat score threshold, wherein the good neighbor cell data structure comprises one or more neighbor cells, a location of each neighbor cell, and a time when each neighbor cell was updated in the good neighbor cell data structure;
   performing cell reselection to a second cell;
   determining whether the second cell transmits a system information block (SIB) message indicating fake neighbor cell information and that the good neighbor cell data structure includes an indication of one or more good neighbor cells that are within a time threshold and a location threshold; and
   increasing a threat score for the second cell in response to determining that the second cell provides the SIB message indicating fake neighbor cell information and that the good neighbor cell data structure includes an indication of one or more good neighbor cells that are within the time threshold and the location threshold.

2. The method of claim 1, wherein determining whether the second cell provides a SIB message indicating fake neighbor cell information comprises determining whether the second cell provides a SIB message that indicates no intra-frequency neighbor cells are available or an intra-frequency not allowed to reselect indication.

3. The method of claim 1, wherein determining whether the second cell provides a SIB message indicating fake neighbor cell information comprises determining whether the second cell provides a SIB message that indicates a neighbor cell frequency band that is unusable by the wireless device.

4. The method of claim 1, wherein determining a threat score for a first cell when the wireless device performs cell selection to the first cell comprises performing an authentication procedure for the first cell when the wireless device performs cell selection to the first cell, and
   wherein updating the good neighbor cell data structure in the wireless device using neighbor cell information from the first cell in response to determining that the threat score for the first cell is below the first threat score threshold comprises updating the good neighbor cell data structure using the neighbor cell information from the first cell in response to determining that the first cell has passed the authentication procedure.

5. The method of claim 1, wherein the good neighbor cell data structure comprises one or more frequencies supported by each neighbor cell,
   the method further comprising:
   determining whether the second cell transmits a SIB message indicating a neighbor cell frequency and identifier that match a frequency and identifier supported by a neighbor cell indicated in the good neighbor cell data structure that is within the time threshold and the location threshold; and
   increasing the threat score for the second cell in response to determining that the second cell transmits a SIB message indicating no neighbor cell frequency and identifier that match a frequency and identifier supported by a neighbor cell indicated in the good neighbor cell data structure that is within the time threshold and the location threshold.

6. The method of claim 1, further comprising:
   determining whether the threat score for the second cell exceeds a second threat score threshold;
   deprioritizing the second cell to place the second cell last in a candidate cell data structure in response to determining that the threat score for the second cell exceeds the second threat score threshold;
   determining whether the candidate cell data structure has been updated with a new candidate cell for cell reselection within a first time interval in response to deprioritizing the second cell;
   determining whether the wireless device supports a neighbor cell inter-frequency band provided in the SIB message from the second cell within the first time interval;
   performing a very-short-duration cell bar of the second cell for a second time interval in response to determining that the wireless device does not support a neighbor cell inter-frequency band provided in the SIB message from the second cell nor that the candidate cell data structure provides any new candidate cell for cell reselection; and
   performing a full search for a candidate cell for cell selection during the second time interval.

7. The method of claim 6, further comprising:
   initializing a timer in response to deprioritizing the second cell to place the second cell last in the candidate cell data structure;
   determining whether the new candidate cell for cell reselection satisfies a cell reselection criterion in response to determining that the candidate cell data structure has been updated with a new cell reselection candidate cell; and performing the very-short-duration cell bar of the second cell for the second time interval when the timer expires in response to determining that the new candidate cell for cell selection does not satisfy the cell reselection criterion.

8. The method of claim 7, wherein determining whether the new candidate cell for cell reselection satisfies the cell reselection criterion in response to determining that the candidate cell data structure has been updated with a new candidate cell for cell reselection comprises:
  determining whether the wireless device supports a neighbor cell inter-frequency band provided in the SIB message from the second cell within the first time interval.

9. The method of claim 7, further comprising:
  performing cell reselection to one of neighbor cells indicated in the good neighbor cell data structure that are within the time threshold and the location threshold;
  determining whether the wireless device is repeatedly performing cell reselection to the second cell and the one of the neighbor cells indicated in the good neighbor cell data structure; and
  performing the very-short-duration cell bar of the second cell for the second time interval in response to determining that the wireless device is repeatedly performing cell reselection to the second cell and the one of the neighbor cells indicated in the good neighbor cell data structure.

10. The method of claim 6, wherein performing a cell reselection for a candidate cell during the second time interval comprises:
  adding the one or more neighbor cells indicated in the good neighbor cell data structure to the candidate cell data structure; and
  performing the cell reselection using existing cells in the candidate cell data structure together with newly added one or more neighbor cells indicated in the good neighbor cell data structure.

11. The method of claim 6, further comprising performing a targeted acquisition during the second time interval comprising:
  selecting one of the neighbor cells indicated in the good neighbor cell data structure; and
  performing targeted cell acquisition to the selected one of the good neighbor cells indicated in the good neighbor cell data structure.

12. The method of claim 11, further comprising:
  determining whether the targeted cell acquisition to the selected one of the neighbor cells indicated in the good neighbor cell data structure was successful; and
  triggering an out-of-service condition and performing a full search for a candidate neighbor cell in response to determining that the targeted cell acquisition to the selected one of the neighbor cells indicated in the good neighbor cell data structure was not successful.

13. A wireless device, comprising:
  a wireless transceiver;
  a memory; and
  a processor coupled to the wireless transceiver and the memory, and configured with processor executable instructions to:
    determine a threat score for a first cell when the wireless device performs cell selection to a first cell;
    determine whether the threat score for the first cell is below a first threat score threshold indicative of a trustworthy cell;
    update a good neighbor cell data structure in the wireless device using neighbor cell information from the first cell in response to determining that the threat score for the first cell is below the first threat score threshold, wherein the good neighbor cell data structure by one or more neighbor cells, a location of each neighbor cell, and a time when each neighbor cell was updated in the good neighbor cell data structure;
    perform cell reselection to a second cell;
    determine whether the second cell transmits a system information block (SIB) message indicating fake neighbor cell information and that the good neighbor cell data structure includes an indication of one or more good neighbor cells that are within a time threshold and a location threshold; and
    increase a threat score for the second cell in response to determine that the second cell provides the SIB message indicating fake neighbor cell information and that the good neighbor cell data structure includes an indication of one or more good neighbor cells that are within the time threshold and the location threshold.

14. The wireless device of claim 13, wherein the processor is further configured with processor executable instructions to determine whether the second cell provides a SIB message indicating fake neighbor cell information by determining whether the second cell provides a SIB message that indicates no intra-frequency neighbor cells are available or an intra-frequency not allowed to reselect indication.

15. The wireless device of claim 13, wherein the processor is further configured with processor executable instructions to determine whether the second cell provides a SIB message indicating fake neighbor cell information by determining whether the second cell provides a SIB message that indicates a neighbor cell frequency band that is unusable by the wireless device.

16. The wireless device of claim 13, wherein the processor is further configured with processor executable instructions to:
  determine a threat score for a first cell when the wireless device performs cell selection to the first cell by performing an authentication procedure for the first cell when the wireless device performs cell selection to the first cell, and
  update the good neighbor cell data structure in the wireless device using neighbor cell information from the first cell in response to determining that the threat score for the first cell is below the first threat score threshold by updating the good neighbor cell data structure using the neighbor cell information from the first cell in response to determine that the first cell has passed the authentication procedure.

17. The wireless device of claim 13, wherein:
  the good neighbor cell data structure comprises one or more frequencies supported by each neighbor cell; and
  the processor is further configured with processor executable instructions to:
    determine whether the second cell transmits a SIB message indicating a neighbor cell frequency and identifier that match a frequency and identifier supported by a neighbor cell indicated in the good neighbor cell data structure that is within the time threshold and the location threshold; and
    increase the threat score for the second cell in response to determine that the second cell transmits a SIB message indicating no neighbor cell frequency and identifier that match a frequency and identifier supported by a neighbor cell indicated in the good neighbor cell data structure that is within the time threshold and the location threshold.

18. The wireless device of claim 13, wherein the processor is further configured with processor executable instructions to:
   determine whether the threat score for the second cell exceeds a second threat score threshold;
   deprioritize the second cell to place the second cell last in a candidate cell data structure in response to determine that the threat score for the second cell exceeds the second threat score threshold;
   determine whether the candidate cell data structure has been updated with a new candidate cell for cell reselection within a first time interval in response to deprioritizing the second cell;
   determine whether the wireless device supports a neighbor cell inter-frequency band provided in the SIB message from the second cell within the first time interval;
   perform a very-short-duration cell bar of the second cell for a second time interval in response to determine that the wireless device does not support a neighbor cell inter-frequency band provided in the SIB message from the second cell nor that the candidate cell data structure provides any new candidate cell for cell reselection; and
   perform a full search for a candidate cell for cell selection during the second time interval.

19. The wireless device of claim 18, wherein the processor is further configured with processor executable instructions to:
   initialize a timer in response to deprioritizing the second cell to place the second cell last in the candidate cell data structure;
   determine whether the new candidate cell for cell reselection satisfies a cell reselection criterion in response to determine that the candidate cell data structure has been updated with a new cell reselection candidate cell; and
   perform the very-short-duration cell bar of the second cell for the second time interval when the timer expires in response to determine that the new candidate cell for cell selection does not satisfy the cell reselection criterion.

20. The wireless device of claim 19, wherein the processor is further configured with processor executable instructions to determine whether the new candidate cell for cell reselection satisfies the cell reselection criterion in response to determine that the candidate cell data structure has been updated with a new candidate cell for cell reselection by determining whether the wireless device supports a neighbor cell inter-frequency band provided in the SIB message from the second cell within the first time interval.

21. The wireless device of claim 19, wherein the processor is further configured with processor executable instructions to:
   perform cell reselection to one of neighbor cells indicated in the good neighbor cell data structure that are within the time threshold and the location threshold;
   determine whether the wireless device is repeatedly performing cell reselection to the second cell and the one of the neighbor cells indicated in the good neighbor cell data structure; and
   perform the very-short-duration cell bar of the second cell for the second time interval in response to determining that the wireless device is repeatedly performing cell reselection to the second cell and the one of the neighbor cells indicated in the good neighbor cell data structure.

22. The wireless device of claim 18, wherein the processor is further configured with processor executable instructions to perform a cell reselection for a candidate cell during the second time interval by:
   adding the one or more neighbor cells indicated in the good neighbor cell data structure to the candidate cell data structure; and
   perform the cell reselection using existing cells in the candidate cell data structure together with newly added one or more neighbor cells indicated in the good neighbor cell data structure.

23. The wireless device of claim 18, wherein the processor is further configured with processor executable instructions to perform a targeted acquisition during the second time interval by:
   selecting one of the neighbor cells indicated in the good neighbor cell data structure; and
   perform targeted cell acquisition to the selected one of the good neighbor cells indicated in the good neighbor cell data structure.

24. The wireless device of claim 23, wherein the processor is further configured with processor executable instructions to:
   determine whether the targeted cell acquisition to the selected one of the neighbor cells indicated in the good neighbor cell data structure was successful; and
   trigger an out-of-service condition and perform a full search for a candidate neighbor cell in response to determine that the targeted cell acquisition to the selected one of the neighbor cells indicated in the good neighbor cell data structure was not successful.

25. A processing system for use in a wireless device, comprising:
   a processor configured with processor executable instructions to:
      determine a threat score for a first cell when the wireless device performs cell selection to a first cell;
      determine whether the threat score for the first cell is below a first threat score threshold indicative of a trustworthy cell;
      update a good neighbor cell data structure in the wireless device using neighbor cell information from the first cell in response to determining that the threat score for the first cell is below the first threat score threshold, wherein the good neighbor cell data structure by one or more neighbor cells, a location of each neighbor cell, and a time when each neighbor cell was updated in the good neighbor cell data structure;
      perform cell reselection to a second cell;
      determine whether the second cell transmits a system information block (SIB) message indicating fake neighbor cell information and that the good neighbor cell data structure includes an indication of one or more good neighbor cells that are within a time threshold and a location threshold; and
      increase a threat score for the second cell in response to determine that the second cell provides the SIB message indicating fake neighbor cell information and that the good neighbor cell data structure includes an indication of one or more good neighbor cells that are within the time threshold and the location threshold.

26. The processing system of claim 25, wherein the processor is further configured with processor executable instructions to:
  determine a threat score for a first cell when the wireless device performs cell selection to the first cell by performing an authentication procedure for the first cell when the wireless device performs cell selection to the first cell, and
  update the good neighbor cell data structure in the wireless device using neighbor cell information from the first cell in response to determining that the threat score for the first cell is below the first threat score threshold by updating the good neighbor cell data structure using the neighbor cell information from the first cell in response to determine that the first cell has passed the authentication procedure.

27. The processing system of claim 25, wherein:
  the good neighbor cell data structure comprises one or more frequencies supported by each neighbor cell; and
  the processor is further configured with processor executable instructions to:
    determine whether the second cell transmits a SIB message indicating a neighbor cell frequency and identifier that match a frequency and identifier supported by a neighbor cell indicated in the good neighbor cell data structure that is within the time threshold and the location threshold; and
    increase the threat score for the second cell in response to determine that the second cell transmits a SIB message indicating no neighbor cell frequency and identifier that match a frequency and identifier supported by a neighbor cell indicated in the good neighbor cell data structure that is within the time threshold and the location threshold.

28. The processing system of claim 25, wherein the processor is further configured with processor executable instructions to:
  determine whether the threat score for the second cell exceeds a second threat score threshold;
  deprioritize the second cell to place the second cell last in a candidate cell data structure in response to determine that the threat score for the second cell exceeds the second threat score threshold;
  determine whether the candidate cell data structure has been updated with a new candidate cell for cell reselection within a first time interval in response to deprioritizing the second cell;
  determine whether the wireless device supports a neighbor cell inter-frequency band provided in the SIB message from the second cell within the first time interval;
  perform a very-short-duration cell bar of the second cell for a second time interval in response to determine that the wireless device does not support a neighbor cell inter-frequency band provided in the SIB message from the second cell nor that the candidate cell data structure provides any new candidate cell for cell reselection; and
  perform a full search for a candidate cell for cell selection during the second time interval.

29. The processing system of claim 28, wherein the processor is further configured with processor executable instructions to:
  initialize a timer in response to deprioritizing the second cell to place the second cell last in the candidate cell data structure;
  determine whether the new candidate cell for cell reselection satisfies a cell reselection criterion in response to determine that the candidate cell data structure has been updated with a new cell reselection candidate cell; and
  perform the very-short-duration cell bar of the second cell for the second time interval when the timer expires in response to determine that the new candidate cell for cell selection does not satisfy the cell reselection criterion.

30. A non-transitory, processor-readable medium having stored thereon processor-executable instructions configured to cause a processor of a wireless device to perform operations comprising:
  determining a threat score for a first cell when the wireless device performs cell selection to the first cell;
  determining whether the threat score for the first cell is below a first threat score threshold indicative of a trustworthy cell;
  updating a good neighbor cell data structure in the wireless device using neighbor cell information from the first cell in response to determining that the threat score for the first cell is below the first threat score threshold, wherein the good neighbor cell data structure comprises one or more neighbor cells, a location of each neighbor cell, and a time when each neighbor cell was updated in the good neighbor cell data structure;
  performing cell reselection to a second cell;
  determining whether the second cell transmits a system information block (SIB) message indicating fake neighbor cell information and that the good neighbor cell data structure includes an indication of one or more good neighbor cells that are within a time threshold and a location threshold; and
  increasing a threat score for the second cell in response to determining that the second cell provides the SIB message indicating fake neighbor cell information and that the good neighbor cell data structure includes an indication of one or more good neighbor cells that are within the time threshold and the location threshold.

* * * * *